United States Patent
Massie et al.

(10) Patent No.: US 6,947,737 B2
(45) Date of Patent: Sep. 20, 2005

(54) SYSTEM AND METHOD OF TRANSMITTING DATA MESSAGES BETWEEN SUBSCRIBER UNITS COMMUNICATING WITH/BETWEEN COMPLEMENTARY/DISPARATE NETWORKS

(75) Inventors: Rodney E. Massie, Lindenhurst, IL (US); Patrick J. Leboulanger, St. Charles, IL (US); Chantel M. Speaks, Beach Park, IL (US); Julian M. Franklin, Lindenhurst, IL (US)

(73) Assignee: Motient Communications Inc., Lincolnshire, IL (US)

( * ) Notice: Subject to any disclaimer, the term of this patent is extended or adjusted under 35 U.S.C. 154(b) by 508 days.

(21) Appl. No.: 09/958,752
(22) PCT Filed: Dec. 29, 2000
(86) PCT No.: PCT/US00/35513
§ 371 (c)(1), (2), (4) Date: Oct. 12, 2001
(87) PCT Pub. No.: WO01/50787
PCT Pub. Date: Jul. 12, 2001

(65) Prior Publication Data
US 2002/0160771 A1 Oct. 31, 2002

Related U.S. Application Data
(60) Provisional application No. 60/173,742, filed on Dec. 30, 1999.

(51) Int. Cl.[7] .................................................. H04Q 7/20
(52) U.S. Cl. ...................................................... 455/426
(58) Field of Search .......................... 455/426.1, 426.2, 455/428, 432.1, 432.3, 435.1, 435.2, 403, 414.1, 445, 552.1; 370/351, 353, 354, 355, 356, 368, 389, 392

(56) References Cited

U.S. PATENT DOCUMENTS

| 5,457,680 | A | | 10/1995 | Kamm et al. |
| 5,703,570 | A | * | 12/1997 | Gorday et al. ............. 340/7.22 |
| 5,787,357 | A | | 7/1998 | Salin |
| 5,819,172 | A | | 10/1998 | Campana, Jr. et al. |
| 5,974,300 | A | * | 10/1999 | LaPorta et al. ............ 340/7.23 |
| 6,097,962 | A | | 8/2000 | Corriveau et al. |
| 6,104,712 | A | | 8/2000 | Robert et al. |
| 6,137,791 | A | | 10/2000 | Frid et al. |
| 6,563,817 | B1 | * | 5/2003 | Murai ......................... 370/356 |
| 6,731,621 | B1 | * | 5/2004 | Mizutani et al. ............ 370/338 |
| 6,747,982 | B2 | * | 6/2004 | Nakatsugawa .............. 370/403 |

FOREIGN PATENT DOCUMENTS

JP    05110565 A  *  4/1993  ........... H04L/12/28

* cited by examiner

Primary Examiner—Cong Van Tran
(74) Attorney, Agent, or Firm—Irah H. Donner; Wilmer Cutler Pickering Hale and Dorr LLP

(57) ABSTRACT

A system and method for enabling a first device (502, 504, 506) that may optionally roam between at least first and second wireless networks (500, 1102) to communicate with a second device (502, 504, 506) that may optionally roam between the at least first and second wireless networks (500, 1102). The devices (502, 504, 506) are preferably registered to each network in which the device may roam. A routing switch (1112) first transmits a data message to the receiving device at the last known location of the receiving device. If a negative acknowledgement is received, the message is routed to all other networks to which the receiving device is registered, either serially or in parallel, depending upon the configuration of the transmitting network. Routing devices (1112) and/or gateways (1110) are preferably provided for each network (500, 1102) to provide any required protocol and/or message format conversions.

63 Claims, 19 Drawing Sheets

SYSTEM AND METHOD OF TRANSMITTING DATA MESSAGES BETWEEN SUBSCRIBER UNITS COMMUNICATING WITH/BETWEEN COMPLEMENTARY/DISPARATE NETWORKS

RELATED APPLICATIONS

This application is a U.S. National Phase Application under 35 U.S.C. 371 of International Application No. PCT/US00/35513, filed Dec. 29, 2000, incorporated herein by reference, which claims priority from U.S. provisional application Ser. No. 60/173,742 filed on Dec. 30, 1999 and entitled "(1) ACE Advantages, (2) ACE Redundancy, (3) ACE Manager Problem Diagnosis Tool, (4) Bell Mobility (Canada) Connectivity, (5) Fixed Point Polling Service", the details of which are hereby incorporated by reference.

BACKGROUND OF THE INVENTION

1. Field of the Invention

The present invention relates generally to a system and method of enabling a first wireless subscriber unit (SU) (e.g., a wireless communication SU) communicating with or registered to at least a first network to transmit/receive data to/from a second SU communicating with or registered to at least a second network. The present invention also generally relates to the exchange of data between wireless communication systems and/or complementary networks, and the exchange of data between SUs communicable with such wireless communication systems. More particularly, the present invention relates to a system and method of enabling such transmission in a manner that is transparent to the SUs.

2. Background Description

FIGS. 1–3 show a prior art radio frequency (RF) transmission system 100, as disclosed in U.S. Pat. No. 5,819,172, incorporated herein by reference, for transmitting information from one of a plurality of originating processors A-N to at least one of a plurality of destination processors (A-N) which may be transported during operation. The system 100 includes at least one gateway switch 150 that stores information received from one of the at least one originating processor prior to transmission of the information to the at least one destination processor; a RF information transmission network 130 for transmitting stored information received from one of the at least one gateway switch 150 by RF transmission to at least one destination processor; and at least one interface switch 162 that connects a gateway switch 150 to the RF transmission network 100 and transmits stored information received from one of the at least one gateway switch 150 to the RF information transmission network 100.

The information is transmitted to a receiving interface switch by the electronic mail system in response to an address of the receiving interface switch which has been added to the information originated by the originating processor by either the originating processor or gateway switch 14. The information is transmitted from the receiving interface switch to the RF information transmission network 130 with an address of the destination processor to receive the information which has been added by either the originating processor, a gateway switch or the receiving interface switch.

More particularly, FIG. 2 illustrates a block diagram of the connection between a plurality of gateway switches with mailboxes 150 in different electronic mail systems to the RF information transmission network 160. Multiple gateway switches with mailboxes 150 from a single electronic mail system 1-N may be connected to each interface switch 162 instead of the connection of a single gateway switch with a mailbox to a single interface switch as illustrated. A plurality of interface switches 162 connect information transmitted from at least one electronic mail system as illustrated in FIG. 1. Optionally, a plurality of electronic mail systems 1-N are connected to a data input port, of the RF information transmission system which is preferably hub switch 116. The dotted line communication paths 163 illustrate optional information transmissions in which information from a plurality of different electronic mail systems is concentrated at a single interface switch 304. The dotted line communication paths 161 illustrate connections to additional gateway switches with mailboxes 150 within electronic mail systems 1-N.

The interface switches, 162 function as a security check to determine that information transmissions originating from a gateway switch with mailbox 150 represent transmissions which should be coupled to a hub switch 116 of the RF information transmission network 160. The security check is performed by the interface switch 162 comparing the identification number of the RF receiver 119 which has been added by either an originating processor A-N or a gateway switch with mailboxes 150 with permissible identification numbers or the interface switch performing the addition of the identification number.

The interface switch 162 also removes information added by the electronic mail system 1-N to the information originated by the originating processor A-N from the stored information received from one of the gateway switches 14, and adds information used by the RF information transmission network 130 during transmission of the information originated at the originating processor to a RF receiver 119 in the RF information transmission network 130 which receives the information and transfers it to the destination processor A-N. Additionally, the interface switch 162 encodes data, which is required to format the display of the cathode ray tube (CRT) of the destination processor for the electronic mail system to which the destination processor is connected, in the form of a character or characters which are decoded by either the RF receiver 119 or the destination processor A-N. This information is added in decoded form back to the information which is processed by the destination processor with a format of the electronic mail system to which the destination processor A-N is connected.

The interface switches 162 also function to store information which has been stored by at least one gateway switch 150 that is received from a plurality of originating processors, and assemble the information from a plurality of originating processors into a packet having a predetermined format and transmit the packet to the hub switch 116 within the RF information transmission network 160. The hub switch is the preferable node in the RF information transmission network to which communications from the gateway switches 150 should be transmitted as a consequence of it having jurisdiction over both local access and transport area (LATA) switches 150 and the local switches 112 in the RF information transmission network, which results in lesser network overhead.

The hub switch 116 receives the packet from the receiving interface switch 162 and disassembles the packet into information from the plurality of originating processors. The originating processors are either within a single electronic mail system such as system 1, or from a plurality of electronic mail systems, such as systems 1-N, or from outside of any electronic mail system from at least one additional processor 312 which is connected directly to interface switch 162 to originate information to be transmitted to a destination processor A-N in an electronic mail system as described below. The RF information transmission network 130 transmits the disassembled information from the hub switch 116, including the identification number of the RF receiver 119 transferring information, to the destination processor A-N to a local switch 112 storing the file identified by the identification number and any destination of the RF receiver in the RF information transmission network to which the information and identification number is to be transmitted by the RF information transmission network, and adds any destination of the RF receiver to the information. The RF information transmission network, in response to any added destination, transmits the information and identification number to the destination for RF broadcast to the RF receiver 119 for transfer to the destination processor A-N.

The information is transmitted to a receiving interface switch 162 from one or more gateway switches 150 by one or more electronic mail systems 1-N in response to an address of the receiving interface switch which has been added to the information originated by the originating processor by either the originating processor or gateway switch. The information is transmitted from the receiving interface switch 162 to the RF information transmission network with an address of the destination processor, such as a name of a user of the destination processor A-N, to receive the information which has been added by either the originating processor A-N, a gateway switch 150 or the receiving interface switch 304.

Preferably, the address of the receiving interface switch is a code word, such as "TF-MOBOX", which is recognized throughout the electronic mail system when appended to information as directing the information to be transmitted to the interface switch 304. The address of the destination processor is preferably the identification number of the RF receiver 119 within the RF information transmission network 160. The address of the receiving interface switch may be added to the information originated by the originating processor, by a gateway switch 150 or by the originating processor A-N. The address of the receiving interface switch 162 may be added to the information by matching an identification of the destination processor A-N which may be the name of the individual utilizing the processor or some other information to add an address of an interface switch such as the aforementioned "TF-MOBOX" stored with the matched identification of the destination processor to the information as the address of the receiving interface switch.

Alternatively, the originating processor may be used to add the address of the receiving interface switch 150 by inputting the address of the receiving interface switch (TF-MOBOX) along with an identification of the destination processor A-N (name of recipient using the processor). The originating processor A-N may also add the address of the receiving interface switch 162 by matching an identification of the destination processor (name of the user of the processor) with a stored identification of a destination processor and adding an address of the interface switch (TF-MOBOX) stored with the matched identification of the destination processor to the information as the address of the receiving interface switch.

The identification number may be added to the information originated by the originating processor or, alternatively, maybe added by the originating processor by matching an identification of the destination processor (the name of the user of the processor) with a stored identification of a destination processor (the authorized user of the destination processor) and adding an identification number stored with the matched identification of the destination processor to the information as the identification number of the RF receiver 119. Alternatively, the aforementioned matching process may be performed by either the gateway switch 150 or the interface switch 304. The additional processors 312 originates information from outside of any electronic mail system. The processors 312 provide an address of at least one destination processor in an electronic mail system, such as the name of the user, to receive information transmitted by the RF information transmission system 160, or an identification number of the RF receiver 119 receiving information and transferring the information to the destination processor. The interface switch 162 which receives the information from each processor 312 adds information used by the RF information transmission network 130 during transmission of the information to the RF receiver 119 receiving the information in the same manner as described above with respect to the interface switch 304.

Processors 312 are connected directly to the interface switch 162 and are only required to have a telephone modem and support programming to format information for RF transmission to a destination processor A-N within any one of one or more electronic mail systems 1-N. The processors 312 are not required to have the necessary electronic mail system software present in originating processors A-N or interconnections with an electronic mail system. As a result of the connection to the interface switch 304, information originating from the additional processors 312 may be transmitted by RF transmission to a destination processor A-N within any one or a plurality of electronic mail systems with the user of the processor 312, the processor 312 or the interface switch 162 only having to supply an identification number of the receiver 119 to input information into the RF information transmission system 130 for RF transmission to a destination processor.

The difference between originating information by one of the additional processors 312 outside of any electronic mail system and originating information by one of the processors within one of the electronic mail systems is that the direct connection of the additional processor to the interface switch 162 eliminates the requirement for the adding of an address of the interface switch 162 which is required by the electronic mail systems to forward the information to the interface switch where necessary formatting of the information to be compatible with the RF information transmission system is performed. The interface switch 162 packetizes information originating from the additional processors 312 in the same manner as described above with respect to information originating from within an electronic mail system.

Information from within an electronic mail system and originating from additional processors 312 outside of the electronic mail system may be formatted into the same packets which are forwarded to the hub switch 116. Additionally, interface switch 162 may be connected only to the additional processors 312 to provide an interface only for processors outside of any electronic mail system to destination processors A-N within one or more electronic mail systems 1-N. The only information which is necessary to be inputted by the additional processors 312 is the address of the destination processor (user of the processor). The addition of the identification number of the receiver 119 may be added by matching of an identification of the destination processor with stored destination processors within the additional processor 312, or the interface switch 162 with an identification number of the receiver 119 stored with an identification of a destination processor A-N used as an identification of the destination processor upon a match having been made.

Prior art FIGS. 1–3, however, do not generally relate to, for example, a system and method of enabling a first wireless SU registered to or communicating with a first network to transmit/receive data to/from a second SU registered to or communicating with a second network.

Packet or data communication between data networks is not fully standardized. As a result, a number of different standards, protocols, etc. are available to provide packet or data communication between, for example, a first SU registered to or communicating with a first network to transmit/receive data to/from a second SU registered to or communicating with a second network. Such differences in standards are especially true with respect to maintaining the location and registration status of a particular SU. The manner in which such data is maintained is referred to as "mobility management" and is needed for enabling a SU to freely travel or roam within a particular network.

U.S. Pat. No. 6,137,791 to Frid et al. discloses a specialized roaming mechanism enabling a mobile station to transmit data from a first network utilizing a Mobile internet protocol (IP) Method (MIM) and to a second network utilizing a Personal Digital Cellular Mobility Method (PMM). As shown in prior art FIG. 4, which shows a mobile station 490 associated with an MIM network 400 within a PMM network 10. The MIM mobile station 490 is associated with a home agent (HA) 320. Such a HA can be located within the MIM network 400 or within an external data network.

In order to transmit towards the mobile station, the HA 440 needs a corresponding foreign agent (FA) located within the visited geographic area. However, since conventional PMM network 410 does not include a FA, no IP tunnel can be established between the HA 440 and the PMM network 10. An IP tunnel carries a foreign protocol within a TCP/IP packet (e.g., IPX (Internetwork Packet Exchange) can be encapsulated and transmitted via TCP/IP). Therefore, a FA 420 is introduced into the PMM network 410 to effectuate an IP tunnel between the HA 440 and the PMM network 10.

When the MIM mobile station 490 is in a new geographic area within the PMM network 10, the mobile station 490 performs a registration in a conventional manner by transmitting a location registration request over the air-interface 402. The mobile station 490 may further be associated with a data terminal equipment (DTE) 20A. The base station (BS) 444 receives the request and forwards it to the connected visited mobile switching center (VMSC) 40. The VMSC 40, in turn, performs an authentication procedure by transmitting a Subscriber Authentication Information Retrieval Request 411 to an associated gateway location register (GLR, also known as a visitor location register VLR) 620. The GLR 620, in turn, transmits an Internet-working Authentication Information Retrieval Request signal 415 to a home location register (HLR) 455 associated with the registering mobile station 20. The associated HLR 455 authenticates the subscriber and informs the GLR 430 with necessary authentication data via Inter-working Authentication Information Retrieval Response signal 660. Such data include the authentication keys associated with the mobile station 20.

The GLR 620, in turn, informs the results 413 back to the requesting VMSC 40. The VMSC 442 then transmits an Authentication Request signal to confirm the authentication data with the mobile station 20. In response, the mobile station 490 provides the requested authentication data via an authentication response signal 690. After verifying the received data and confirming the mobile station 20, a location registration acknowledgment signal is transmitted to the mobile station 490 by way of air-interface 402. The mobile station 490 is now registered to access the serving mobile telecommunications network for normal mobile services (i.e., voice call connection).

After establishing the authentication procedure, the associated DTE 490A enters packet mode and instructs the mobile station 490 to transmit a packet communication registration request signal to the visited packet mobile switching center (VPMSC) 480 through the VMSC 40. Such a separate request is necessary to further enable the mobile station 490 to communicate instead of normal voice data. The VPMSC 480 may further communicate with the associated GLR 430 to authenticate the mobile station 490 for packet data communication (not shown). In return, the VPMSC 480 may also transmit a packet authentication request signal 720 to the mobile station 20. The mobile station 490 may then respond with a packet authentication response signal 730. After verifying that the mobile station 490 is authenticated to utilize packet communication, a packet communication registration response signal 740 is provided back to the mobile station 20. The mobile station 490 then enters packet mode.

For mobile stations belonging to the MIM network 400 and currently traveling within the PMM network 10, the VPMSC 480 establishes an IP tunnel 455 with the newly created FA 310. More specifically, the VPMSC 480 creates a first IP tunnel 455 with a gateway packet mobile switching center (GPMSC) 450 serving the PMM network 10. The GPMSC 70, in turn, interfaces with the FA 310. As described above, since the mobile station 490 is associated with the MIM network 300, a HA 440 associated with mobile station 490 receives all incoming packet data addressed towards the mobile station 490 currently roaming within the PMM network. Since the HA 440 requires a FA to establish an IP tunnel and to communicate received packet data therebetween, the new FA 420 as described above is introduced within the PMM network 410 in accordance with the teachings of the present invention.

The DTE 490A connected to the mobile station 490 then performs a PPP establishment procedure towards the FA/GPMSC 310/70. The DTE then sends a Mobile IP Agent Solicitation message to effectuate an IP connection with the home network. The new FA node 420 of the PMM network 410 responds with a mobile IP agent advertisement message. The DTE then sends a mobile IP registration request message to the FA 310. The FA 420 then identifies the HA 440 associated with the roaming mobile station 490 and forwards the message to the identified HA 320. The HA sends a mobile IP registration reply message 810 back to the FA/GPMSC 310/70 and further establishes a second IP tunnel 408 with the serving FA 310. The FA/GPMSC 310/70 then forwards such a message 820 to the DTE 20A.

A data delivery between the HA 440 and the DTE 490A is effectuated thereafter. For example, for incoming data packets 406 addressed towards the DTE 20A, the packets are initially received by the HA 440 and routed to the DTE 490A via the second IP tunnel 408 and the first IP tunnel 750. For outgoing data packets 404 originated from the DTE 20A, the packets are first routed by the first IP tunnel 455 towards the FA 420 and then, for example, to an appropriate external network 900.

The GPMSC 450 associated with the PMM network 410 further includes an interface module 460 for interfacing and communicating with the newly introduced FA 310. Furthermore, in order to facilitate the DTE's PPP establishment request, the GPMSC 450 is further equipped with a PPP server 610.

However, unlike the present invention which is directed to data communication between two or more disparate networks, U.S. Pat. No. 6,137,791 is directed to voice communication between a first data packet network using a MIM and a second data packet network utilizing a Personal Digital Cellular Mobility Method (PMM). There is currently no known general mechanism for enabling SUs to transmit and/or receiver electronic messages while communicating with or utilizing a disparate, different, and/or incompatible second packet network.

Accordingly, there is a need for a system and method to enable, for example, a SU that transmits data to efficiently and/or seamlessly (e.g., transparent to the SUs) communicate from a first mobile telecommunications network to, a destination at a second mobile telecommunications network.

SUMMARY OF THE INVENTION

It is a feature and advantage of the present invention to enable two or more SUs to efficiently and/or seamlessly transmit data between two or more different, disparate and/or communicably different networks.

It is another feature and advantage of the present invention to enable SUs to communicate between two or more different, disparate and/or communicable different networks without requiring the SUs to be modified and/or communicate in a specialized manner.

It is still another feature and advantage of the present invention to enable data to be transmitted from a SU in a first network to a SU in a second network by physically and/or logically modifying only the first network and/or the second network.

It is still another feature and advantage of the present invention to enable data to be transmitted from a SU in a first network to a SU in a second network without having to modify the hardware and optionally the software of the SU in the first network and/or the SU in the second network.

In one embodiment, the present invention provides a system and method for enabling SUs to seamlessly transmit data to any number of complementary networks. That is, both the sending and receiving SUs are unaware of the fact that they are sending data to, receiving data from, a SU in a different network. The primary network is preferably a terrestrial network, whereas the secondary network(s) can be either a satellite network (e.g., NORCOM) and/or a terrestrial network (e.g., Bell Mobility Canada). Other networks may alternatively be used. Thus, with the present invention, SUs can communicate with and optionally be registered with, for example, at least two different networks, and transmit data therebetween, where the networks may optionally be using different data communication protocols.

One embodiment of the present invention enables the primary network to look like a host to one or more complementary networks when sending a message thereto. In this embodiment, the SUs communicate and/or register either with each of the primary and/or one or more secondary networks. For example, if the primary network is a U.S. based network, and a SU normally residing in the U.S. travels to, for example, Canada, the SU can send an e-mail using the secondary network, which transmits the e-mail message to the designated SU in the primary and/or secondary network.

The present invention provides, for example, an interface or input to the one or more complementary networks by, for example, establishing a TCP/IP connection, and appropriately formatting the transmission headers. The primary network interfaces to each of the one or more secondary networks, preferably as if it were a standard customer host to the secondary network. This host connection can be facilitated by a server or computer system that creates appropriate message transmission headers in accordance with the protocol used by the secondary network. This enables the secondary network to interpret the headers, and subsequently route the message to the designated SU. A queue manager within at least the primary network can be provided that keeps track of where the SUs are located (e.g., in the primary network or a complementary network), and thus where messages need to be sent to reach each respective SU in either the primary or secondary network.

In the case of an e-mail message sent from a SU in the primary network to a SU in a complementary network, the host computer may be, for example, a server associated with the e-mail or communication service of the primary network. If a SU in the primary network sends an e-mail message or data message to a SU in the secondary network, the secondary network will recognize that the receiving SU is registered thereto, and attempt to route the message to the designated SU.

In another embodiment, SUs in the complementary network can also send data messages to the primary network. The complementary network may have, for example, a gateway (or similar hardware and/or software) that enables the complementary network to send messages to the primary network. In this embodiment, physical and/or logical changes may be required to the secondary network. However, advantageously no such changes are required to be made to the secondary network when the secondary network only receives messages (i.e., does not transmit messages to another network).

The present invention contemplates that the transmitted data is first sent to the last known network that the intended receiving SU was located. If a connection cannot be established with the SU in that network, the data will then be sent to the other (or one of the other) network(s) to which the SU is registered. In the case of multiple complementary networks or in alternative embodiments of the invention, the data can be sent serially, to one complementary network at a time, or in parallel (i.e., substantially simultaneously to all networks to which the SU is registered).

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other systems and methods for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The Detailed Description including the description of a preferred structure and method as embodying features of the invention will be best understood when read in reference to the accompanying figures wherein.

DETAILED DESCRIPTION

Reference now will be made in detail to the presently preferred embodiments of the invention. Such embodiments are provided by way of explanation of the invention, which is not intended to be limited thereto. In fact, those of ordinary skill in the art may appreciate upon reading the present specification and viewing the present drawings that various modifications and variations can be made.

For example, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

Figure 1:
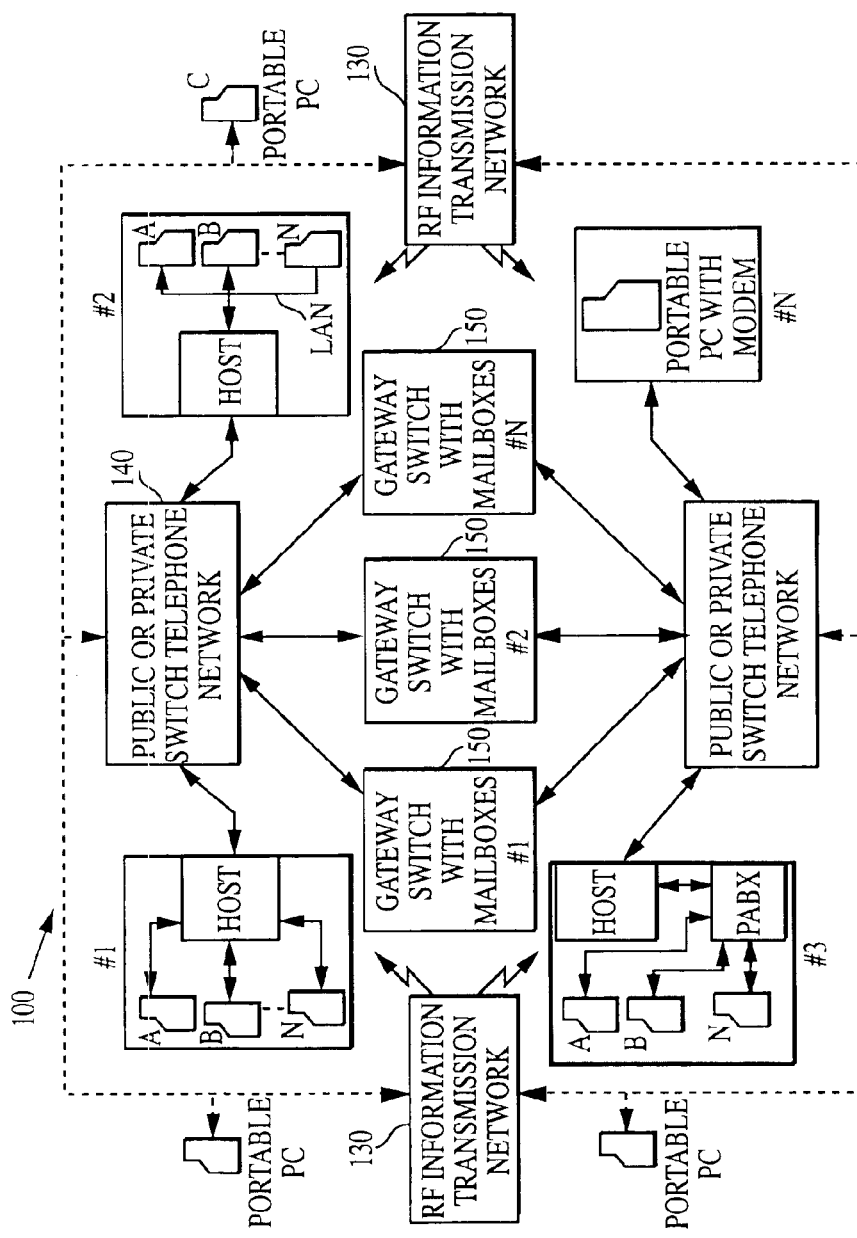
FIG. 1 illustrates a prior art block diagram of a known messaging system.
Figure 2:
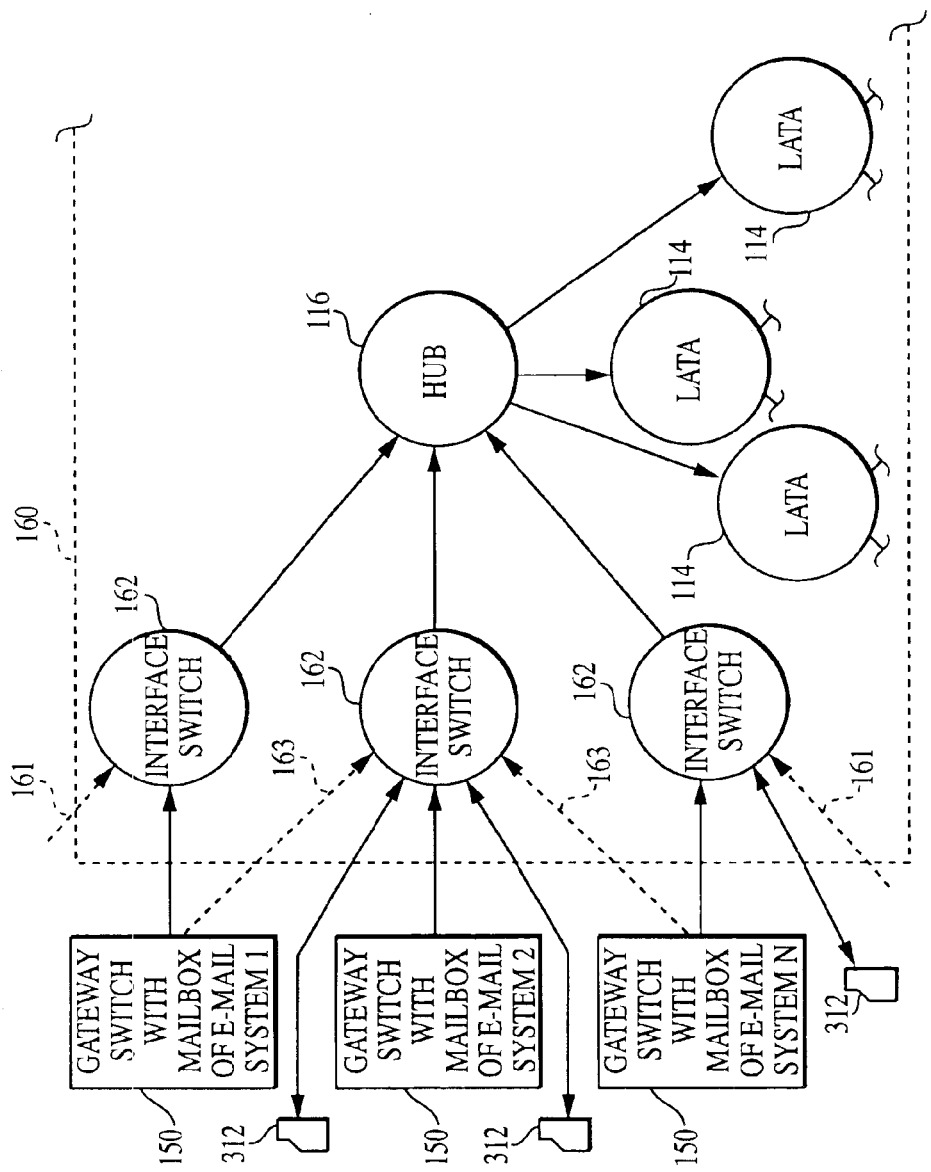
FIG. 2 illustrates a prior art block diagram of the connection of a plurality of electronic mail systems through a plurality of interface switches to an input port of an RF information transmission network.
Figure 3:
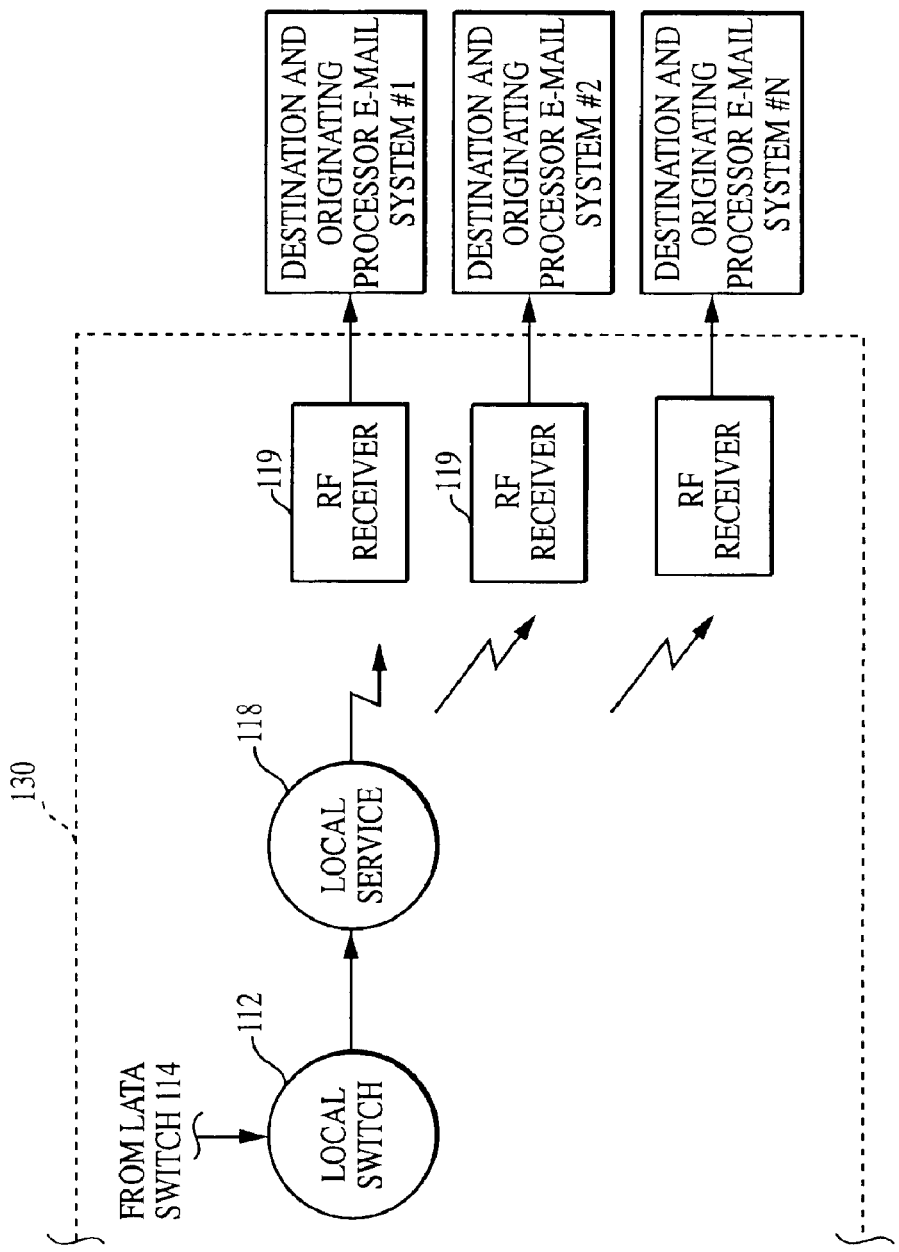
FIG. 3 illustrates a prior art block diagram of the transmission of information originating from a plurality of electronic mail systems to a plurality of destination processors.
Figure 4:
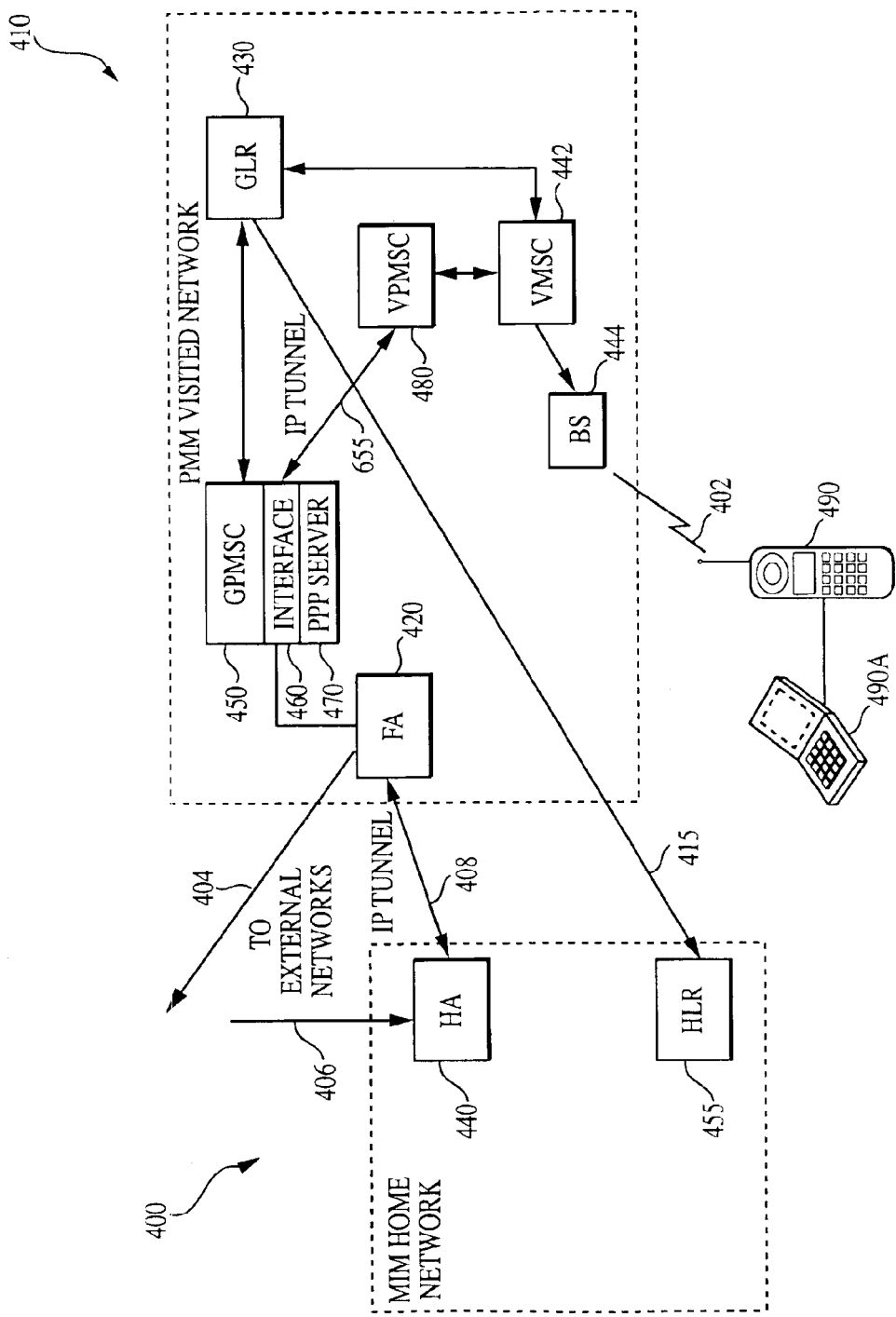
FIG. 4 is a prior art block diagram of two different packet data networks illustrating the roaming of a mobile station transmitting voice data from a first packet data network to a second packet data network.
Figure 5:
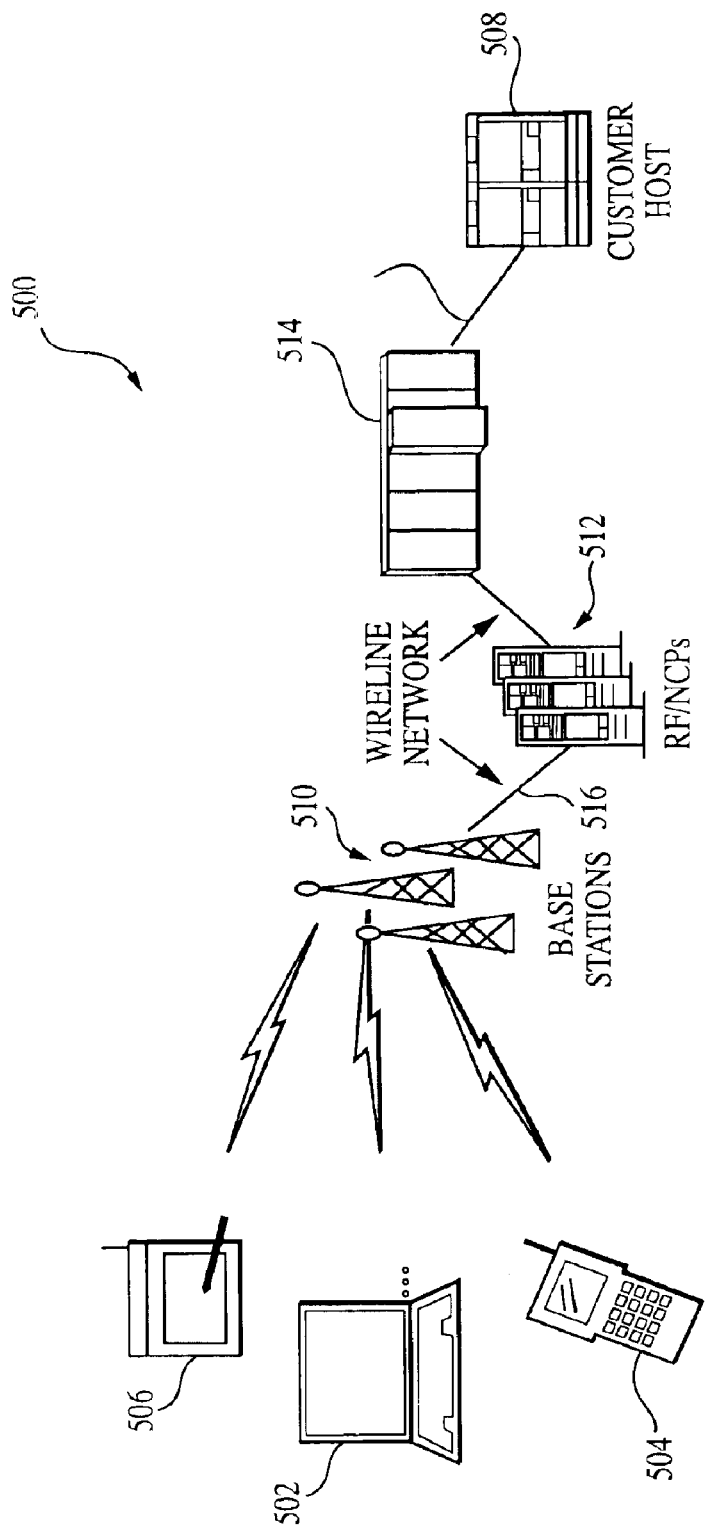
FIG. 5 is a schematically simplified representation of the Motient$^{SM}$ terrestrial communications network.

In accordance with the present invention, it is preferred that for terrestrial transmission a network such as the Motient$^{SM}$ network (previously known as the ARDIS$^{SM}$ network) shown in FIG. 5 be utilized. Terrestrial networks of this nature provide secure, portable, two-way communication between, for example, wireless data terminals and/or mobile data terminals.

The Motient$^{SM}$ network 500 is a terrestrial wireless two-way data network that is based on Motorola's RD-LAP technology. It was originally developed and jointly owned by Motorola and IBM. In 1995 Motorola acquired 100 percent ownership of what was then called the ARDIS® (Advanced Radio Data Information Services) network. In 1998, ARDIS® was acquired by American Mobile Satellite Corporation (now Motient Corporation).

The Motient$^{SM}$ network 500 covers at least ninety percent of the urban business population and more than 400 metropolitan area in the United States, Puerto Rico and the Virgin Islands. Two standard air-interface protocols have been developed for the network 500. The standard MDC-4800 protocol provides a 4800 bit/sec service, and the standard RD-LAP protocol provides a 19.2 kbit/sec service.

The network 500 allows SUs such as an intelligent terminal or computing device 502, handheld device 504, and/or other communications device 506 to transmit and/or receive data messages. SUs 502, 504, 506 therefore, typically have a radio frequency (RF) modem for sending and receiving signals. The RF modem utilizes the MDC-4800 and/or RD-LAP protocols to enable to SUs to gain access to the Motient$^{SM}$ network 500. In the event the a network other than the Motient$^{SM}$ network 500 is utilized, other air-interface communication protocols may be used. For example, if a MOBITEX network is used, the air-interface protocol would be Gaussian minimum shift keying (GMSK).

The network 500 has over 1750 base stations (510) that provide service throughout the United States, Puerto Rico, and U.S. Virgin Islands. Each base station 510 covers a radius of approximately 15–20 miles. The base stations 510 are radio frequency towers that transmit or receive radio signals between SUs 502, 504, 506 and the Radio Frequency/Network Control Processors (RF/NCPs) 512. Base stations 510 transmit and receive radio signals, preferably using a narrow band FM transmitter and receiver operating in the 800 MHz frequency band. There are separate frequencies for the transmit path and the receive path; together these two frequencies represent a full duplex channel that normally transmits data at 4800 bps in both directions. Other standard transmission methods may alternatively be used in other standard communication systems.

In operation, for a message "inbound" to the network 500 from a SU 502, 504, 506, the signal is "heard" or received by the base stations 510 and sent over dedicated leased lines 516 to a RF/NCP 512. The network 500 employs an automated roaming capability that allows the free movement of SUs 502, 504, 506 between cities and between multiple channels within a given city. This capability allows the SUs 502, 504, 506 to freely move (roam) across the country and take advantage of all the network services that are available in every locale.

The RF/NCPs 512 are high-speed computers that interconnect multiple base stations 510 with the standard ARDIS® Connect Engine(s) (ACEs) 514. A number of RF/NCPs 512 are located together serving a particular geographical area, each being connected by high speed digital phone service to one of the ACEs 514, which route messages to a destination such as a customer host computer 508 that is directly connected to the network 500 by, for example, a leased telephone line or a value added network.

RF/NCPs 512 manage the RF resources, including the base stations 510 and data sent over the radio channels. Both inbound and outbound channels are managed using different delivery strategies. The RF/NCPs 512 evaluate the strength of e signal received from every wireless device transmission at each base station for each detected inbound data packet. Alternatively, the wireless device or the system may evaluate signal strength and report back to the RF/NCP 512. The RF/NCP then selects the best base station 510 to communicate with that particular wireless device and will send the next outbound message through that base station.

The RF/NCPs 512 also help manage the roaming capability of the network 500. SUs 502, 504, 506 can automatically move (roam) between any of the network 500 frequencies on either of the two protocols (MDC-4800 and RD-LAP 19.2), or between any of the configured network 500 layers that have been configured for in-building or on-street usage. Through periodic transmission of "channel market messages," each SU 502, 504 506 is provided with the most efficient service available in that area. Each RF/NCP 512 also passes information, via a high speed digital line, relating to source, destination and length of each message to an ACE 514 that enables the network 100 to do network analysis of traffic density at each base station 510.

An ACE 514, in turn, passes information back to a RF/NCP 512 concerning whether the SU 502, 504, 506 is properly registered to the network 500 and, if so, what level of service is provided to the respective subscriber 502, 504, 506. The ACEs 514 are general purpose computers that act as the heart of the network 500. The ACEs 514 route messages to the proper destination, store subscriber registration information including entitlement, and perform accounting and billing functions. The ACEs 514 also serve as a point of connectivity to, for example, host 508, perform protocol conversion, and perform network 500 troubleshooting and test functions. A plurality of ACEs 514 are interconnected through dedicated lines, with alternate paths available from each switch as a contingency measure against line interruptions. The linking between host 508 and an ACE 514 is generally accomplished using asynchronous, bisynchronous, Systems Network Architecture (SNA), or X.25 dedicated circuits.

The wireline network 516 provides communication between the customer host computer 508, the ACEs 514, the RP/NCPs 512, and the base stations 510. The wireline network 516 is equipped with communications equipment that relays customer messages. This equipment includes intelligent multiplexers, leased telephone circuits, high-speed modems or digital service units, and modems for both RF/NCP 512 and host 508 connectivity. Accordingly, the various functionality performed by ACE 514 and the other one or more RF/NCPs 512, and base stations 510 may optionally be distributed in various parts/manners to those network components in accordance with alternative embodiments of the invention.

Inside every cell, the SUs 502, 504, 506 access the network 500 using, for example, a random access method called data sense multiple access (DSMA). Before every transmission, a SU 502, 504, 506 listens to a base station 510 to determine if the base station is busy. The SUs are allowed to transmit only when a base station 510 is not busy and/or have capacity to provide service.

Figure 6:
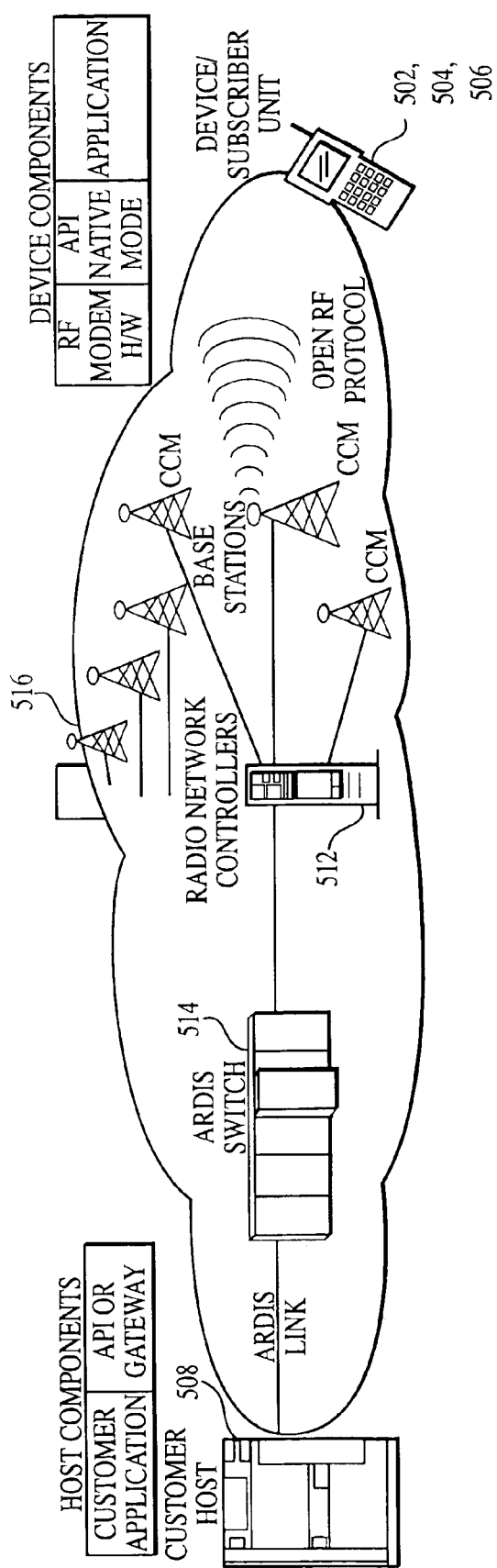
FIG. 6 shows a data flow of a message sent inbound from a host computer to a SU.

Referring now to FIGS. 6–9, typical data flows are shown for the network 500, and are described in detail in *ARDIS DataTAC 4000Software Developers Reference Guide*, Revision 2.0, Jan. 1997, incorporated herein by reference. In these figures, a number in parenthesis (e.g., (1), (5), etc.) refers to that portion of the flow of a message in accordance with the present invention. FIG. 6 shows a message sent inbound from a host computer 508 to a SU 502, 504, 506. The host computer 508 performs compression and/or encryption on data, and is connected to the ACE 514, preferably by an application program interface (API) or standard gateway connection. As will be discussed in further detail herein, the host computer 508 sends an FIBS message header to the ACE 514, which indicates to the ACE 514 that there is an incoming message.

The ACE 514 receives the logical "IB" message from host computer 508, validates the customer to device, determines the RF/RNC 512 that the message should be sent to, and checks if the transmitting SU requires an acknowledgement message (ACK) message. The RF/RNC 512, preferably by a lookup table, sends message packets to the "best" base station 516 (e.g., base station 516 having the strongest signal reception with respect to the RF/RNC 512), controls base station 516 transmission, and optionally sends an ACK message to ACE 514 to indicate, for example, a successful transmission. Similarly, the RF/RNC 512 may also transmit a negative acknowledgement (NAK) message that indicates that the SU 502, 504, 506 may be out of range or out of service. The base station 516 then transmits message packets from the RF/RNC 512 and optionally waits for an ACK message.

Figure 7A:
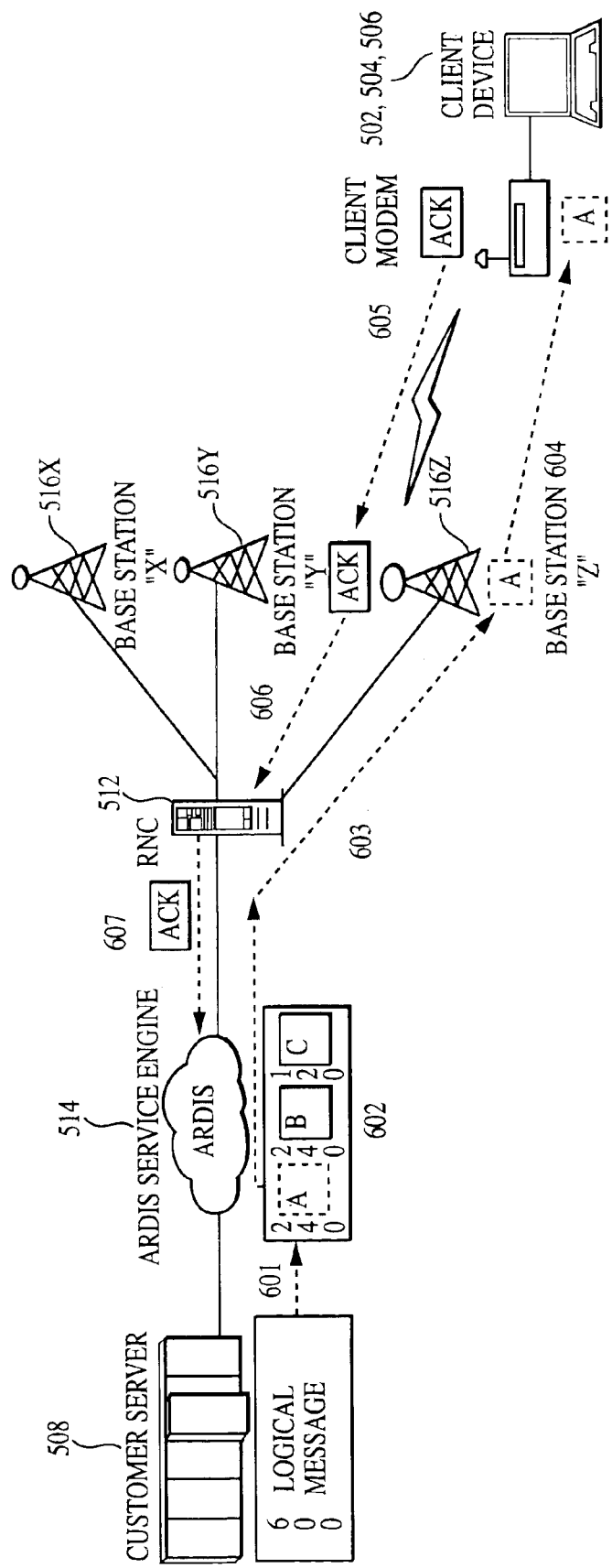
FIGS. 7a and 7b, taken together, show a data flow of a message from a host computer to a SU using the MDC-4800 protocol.
Figure 7B:
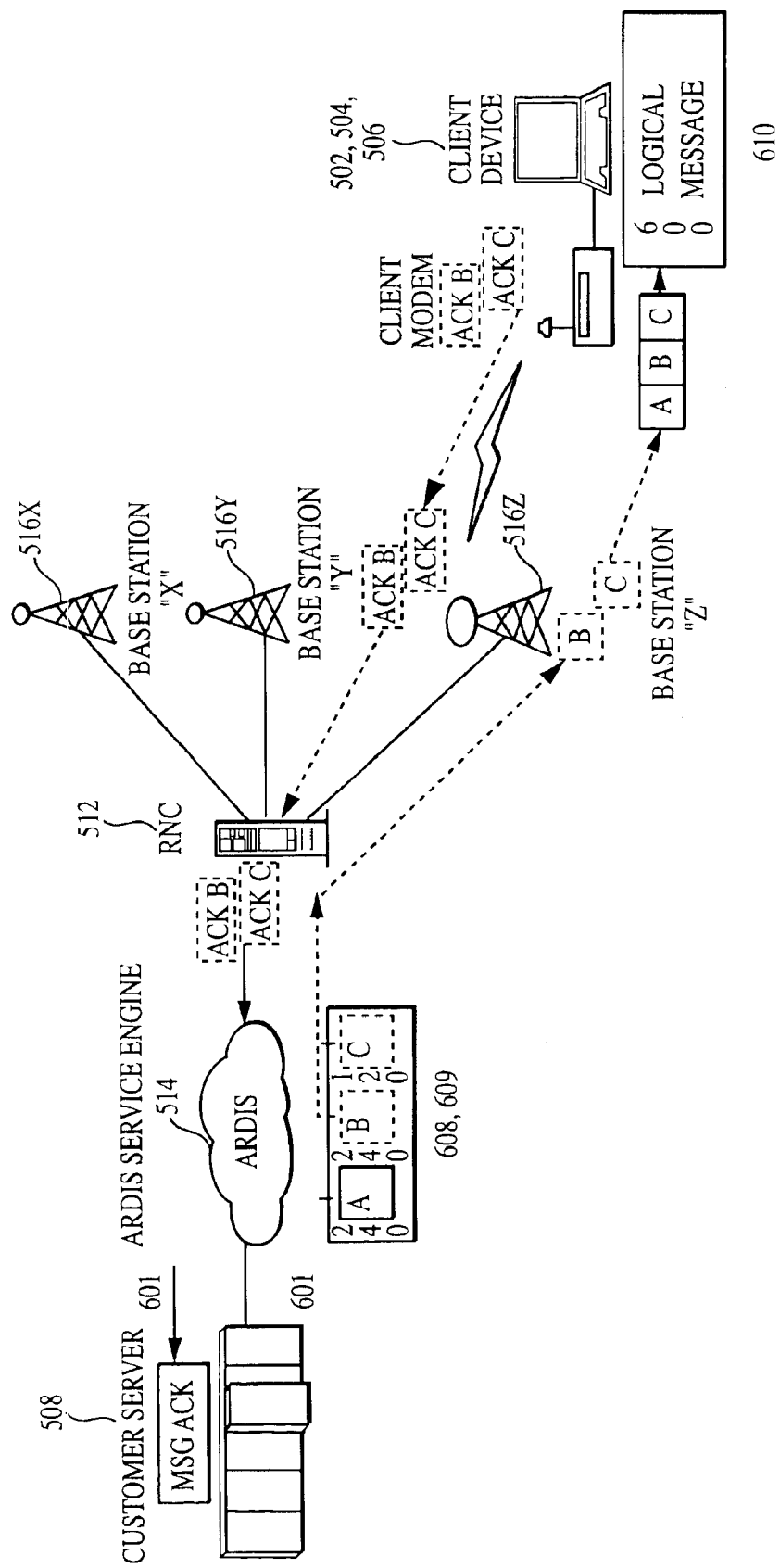

FIGS. 7a and 7b, taken together, show a representative message flow from a message sent from a host computer 508 to a SU 502, 504, 506 using the MDC-4800 protocol. With regard to FIG. 7a, a message is sent from the customer host 508 to the ACE 514 (601). The message can be optionally and preferably segmented into packets (e.g., "A," "B," "C", etc.) (602). The first packet is delivered to the RF/RNC 512 where the destination modem was registered when it was last active. The RF/RNC 512 delivers the first packet (e.g., packet A) to base station 516z (optimal base station for delivery) (603). The base station 516z transmits the packet to a wireless modem (604), which responsively transmits an ACK packet to the base station 516z and then back to the RF/RNC 512 and ACE 514 (605, 606, 607).

Referring now to FIG. 7b, the rest of the packets (e.g., packets B, C, etc.) comprising the message are sent in sequence to the wireless modem and are acknowledged respectively (608, 609). The modem assembles the logical message and delivers it to the application (610). A message acknowledgement is delivered from the ACE 514 to the customer's server 508 (if requested by the server) (611).

Figure 8A:
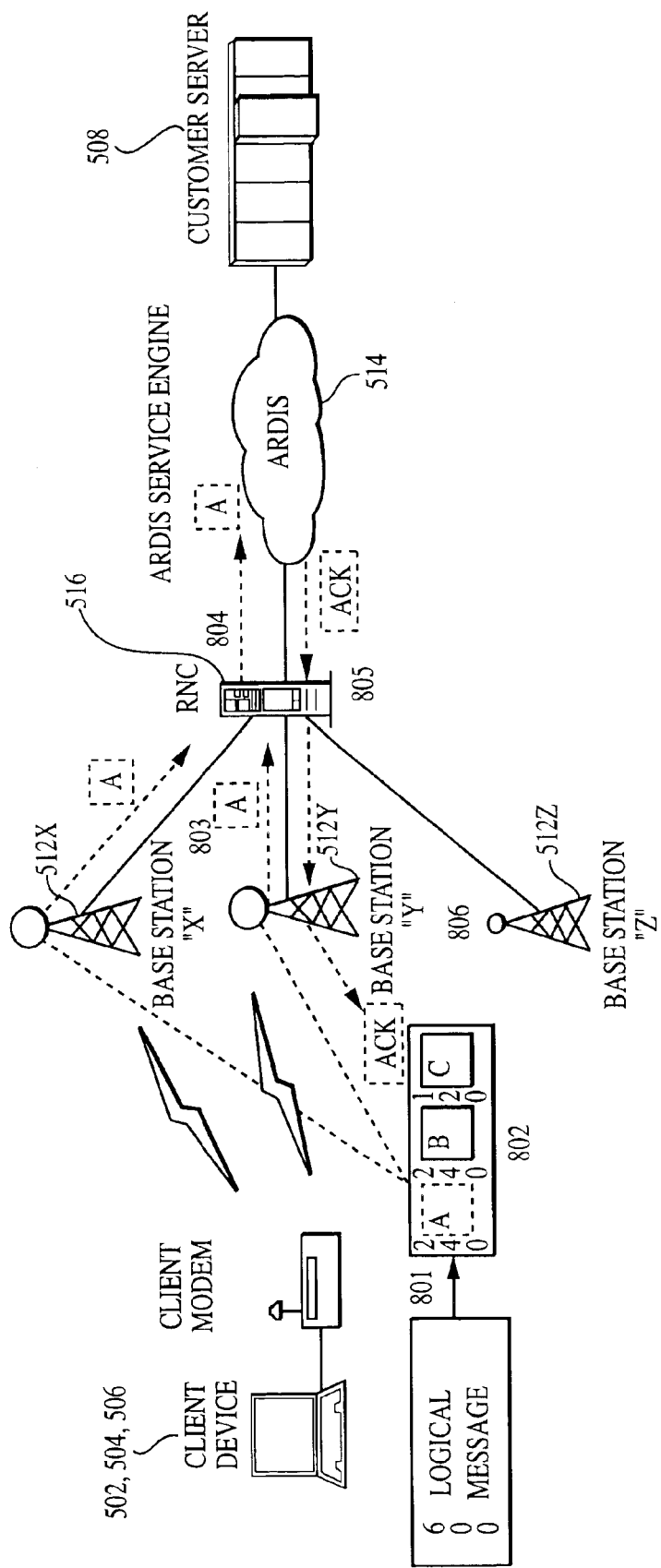
FIGS. 8a and 8b, taken together, show a data flow of a message from a SU to a host computer using the MDC-4800 protocol.
Figure 8B:
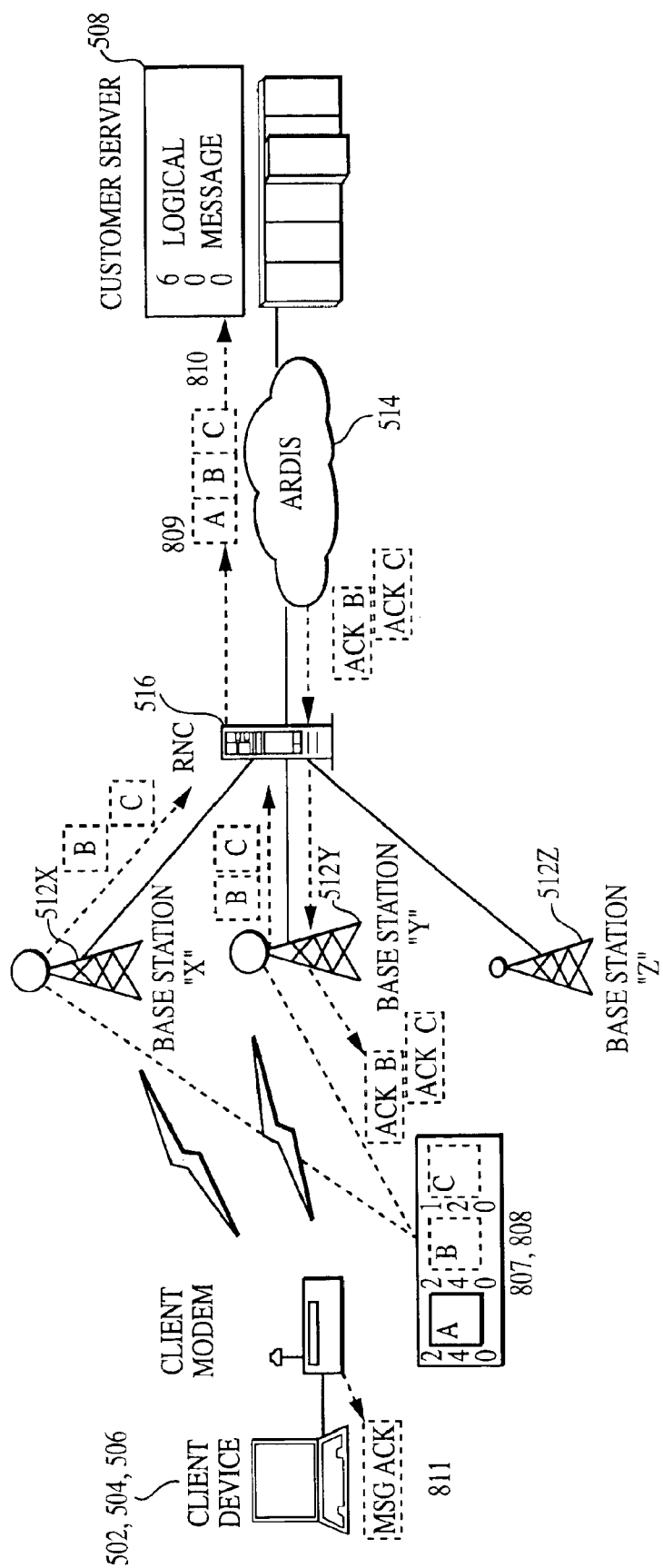

FIGS. 8a and 8b, taken together, show a representative message flow from a SU 502, 504, 506 to customer host 508. A message is sent from the SU 502, 504, 506 application to a wireless modem (801). The message is segmented into packets (e.g., "A," "B," "C,", etc.) (802). The first packet (A) is transmitted to base stations in the area (e.g., 512x and 512y). If the RF/RNC 516 receives multiple copies of the message, it eliminates duplicates. The RF/RNC 516 delivers the first packet (A) to the ACE 514 (804). Base station 512y is chosen, for example, based on predetermined and/or standard criteria, as the most appropriate delivery route. An acknowledgment packet is delivered from the RF/RNC 516 to base station 512y (805). The acknowledgement packet is then delivered to the wireless modem via RF (806). Referring now to FIG. 8b, the process is repeated for the additional packets comprising the logical message (807, 808). The message is assembled, for example, at the ACE 514 (809), and subsequently sent to the application (810). The ACE 512 returns an acknowledgment to the wireless modem (811).

Figure 9:
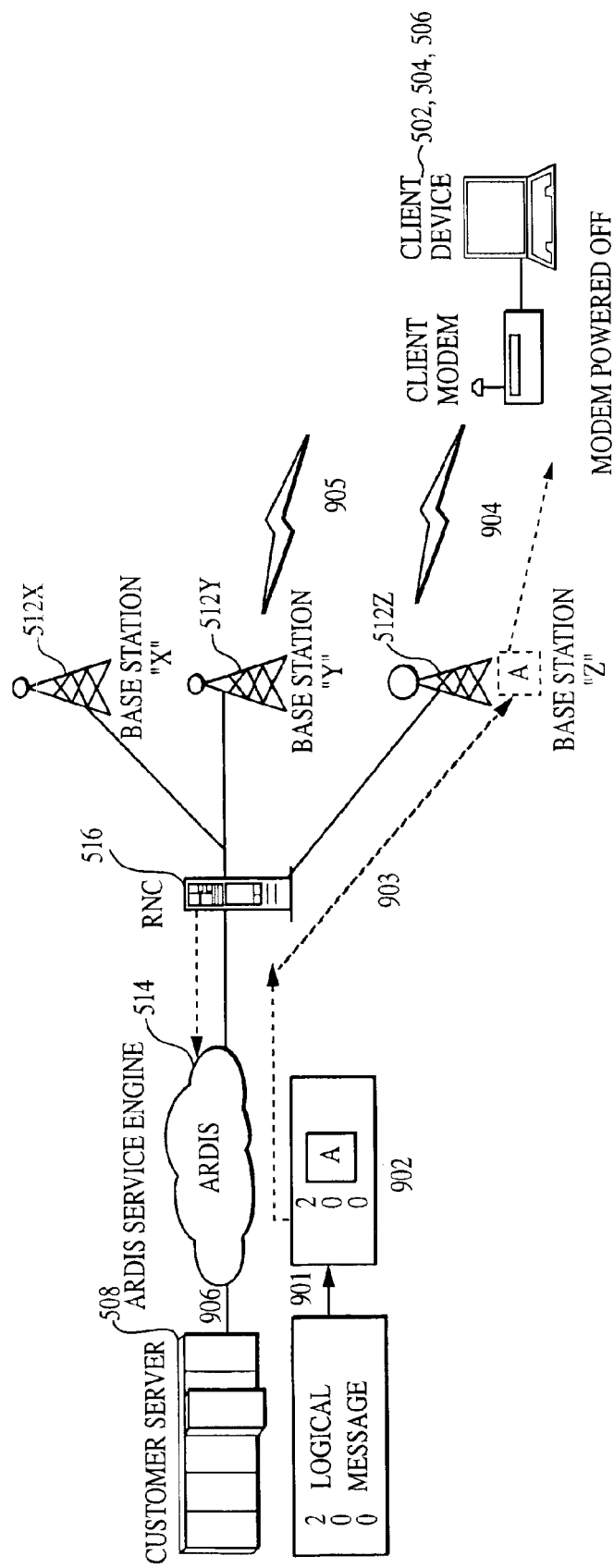
FIG. 9 shows a data flow of a message from a host computer to a SU when the SU is not available.

FIG. 9 shows a representative message flow from customer host 508 to a SU 502, 504, 506 when the SU is not available. A message is sent form the customer host 508 to the ACE 514 (901). The data message can be copied into a packet and delivered to the RF/RNC 516 where the destination modem was registered or located when it was last active (902). The RF/RNC 516 delivers the data message, for example, in packet format to base station 512z (where the last activity occurred) (903). The base station 512z transmits the data message to the wireless modem but does not receive an acknowledgment back, and consequently tries sending the message a second time (904). The base station that serviced the client next to last time is optionally tried initially (e.g., 512y) (905). The ACE 514 transmits a NAK packet to the customer host 508 to indicate that the message could not be delivered (if requested by the server) (906).

Figure 10:
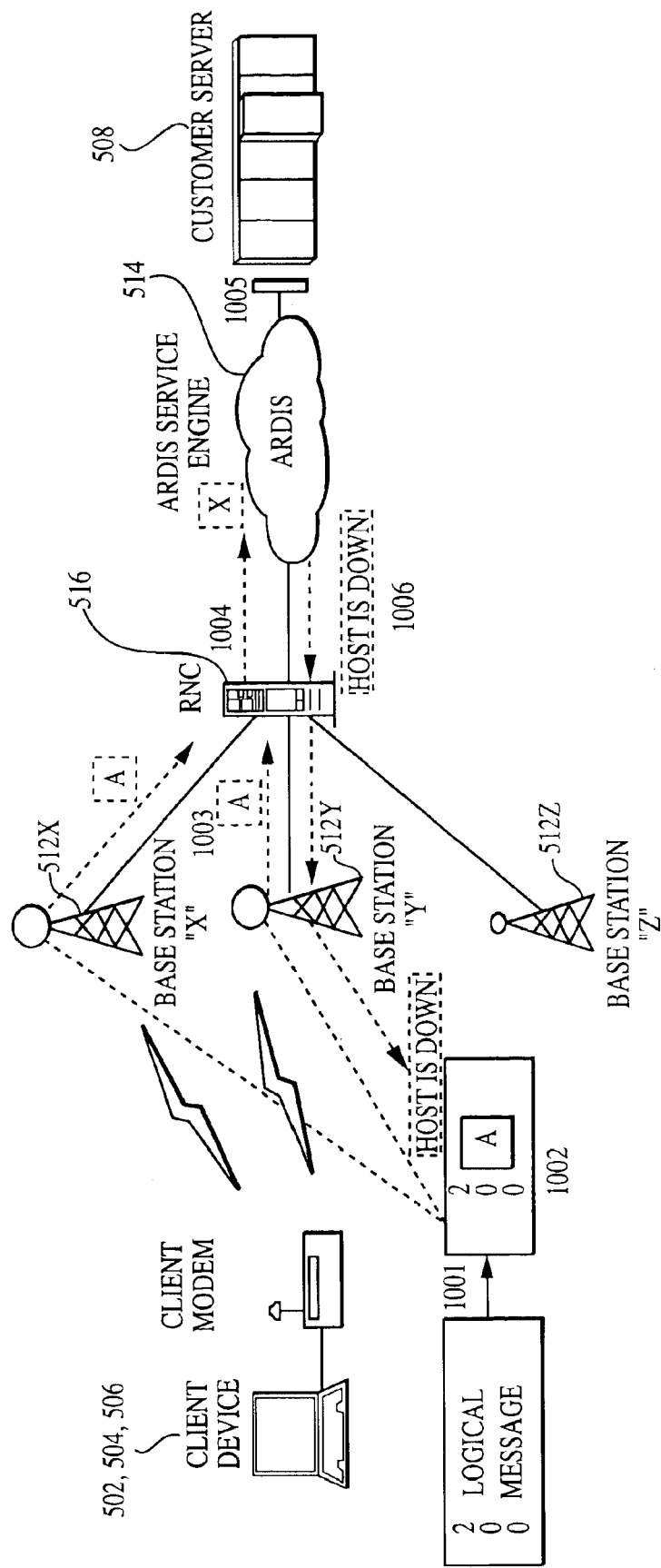
FIG. 10 shows a data flow of a message from a SU to a host computer when the host computer is disconnected.

Referring now to FIG. 10, a representative message flow from a SU 502, 504, 506 to a customer host 508 is shown, where the customer host is disconnected. A message is sent from the SU 502, 504, 506 application to the wireless modem (1001). The message is copied, for example, into a standard packet and transmitted to base stations in the area (e.g., 512x and 512y) (1002). The RF/RNC 516 receives multiple copies of the message and eliminates duplicates (1003). The RF/RNC 516 delivers the packet to the ACE 514 (1004). An attempt is made to send the message to the customer host 508, where line problems, for example, are experienced. If the message cannot be delivered, ACE 514 discards the message (1005). An error message is sent back to the wireless modem indicating that the customer host 508 is down (1006).

Figure 11:
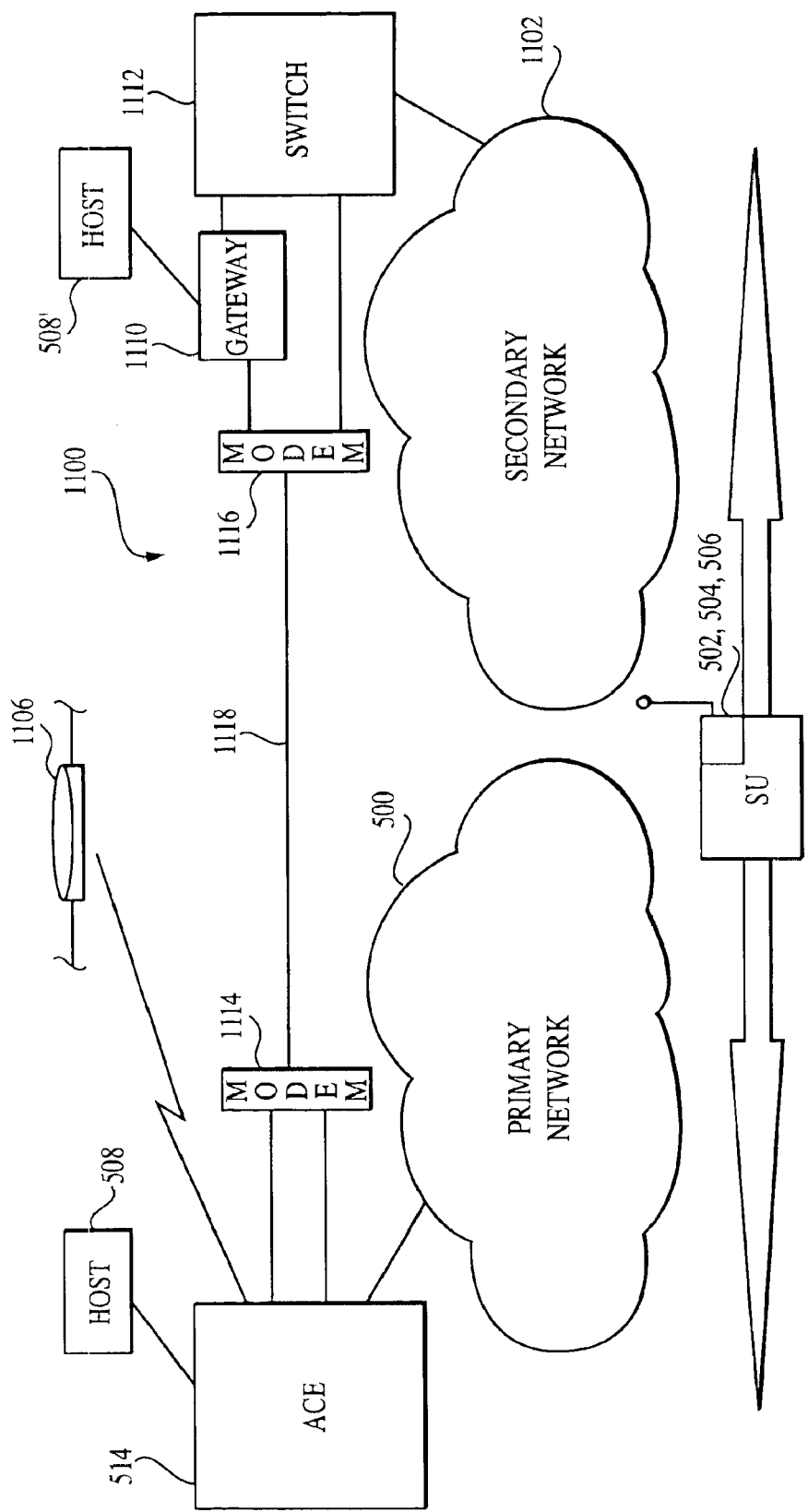
FIG. 11 is a schematically simplified representation of the overall complementary network system.

Referring now to FIG. 11, a high level architecture of the system 1100 in accordance with the present invention is shown. ACE 514 allows a SU 502, 504, 506 to be registered to a plurality of networks or complementary networks (e.g., a primary terrestrial network 500, a secondary terrestrial network 1102, and/or a satellite network 1106). The primary network can be, for example, the Motient$^{SM}$ network 500, the secondary network 1102 can be, for example, the Bell Mobility network, and the satellite network 1106 can be, for example, the NORCOM satellite network. Other networks may alternatively, or in addition, be used. The secondary network(s) preferably has at least one host computer 508 that is connected to a gateway 1110. The host may also be optionally connected to the modem 1116 and/or routing switch 1112. Switch 1112 preferably has a functionality substantially similar to the ACE 514, which will be described herein. Modems 1114, 1116 can be utilized to connect the primary network 500 and secondary network 1102 via, for example, landline 1118.

Figure 12:
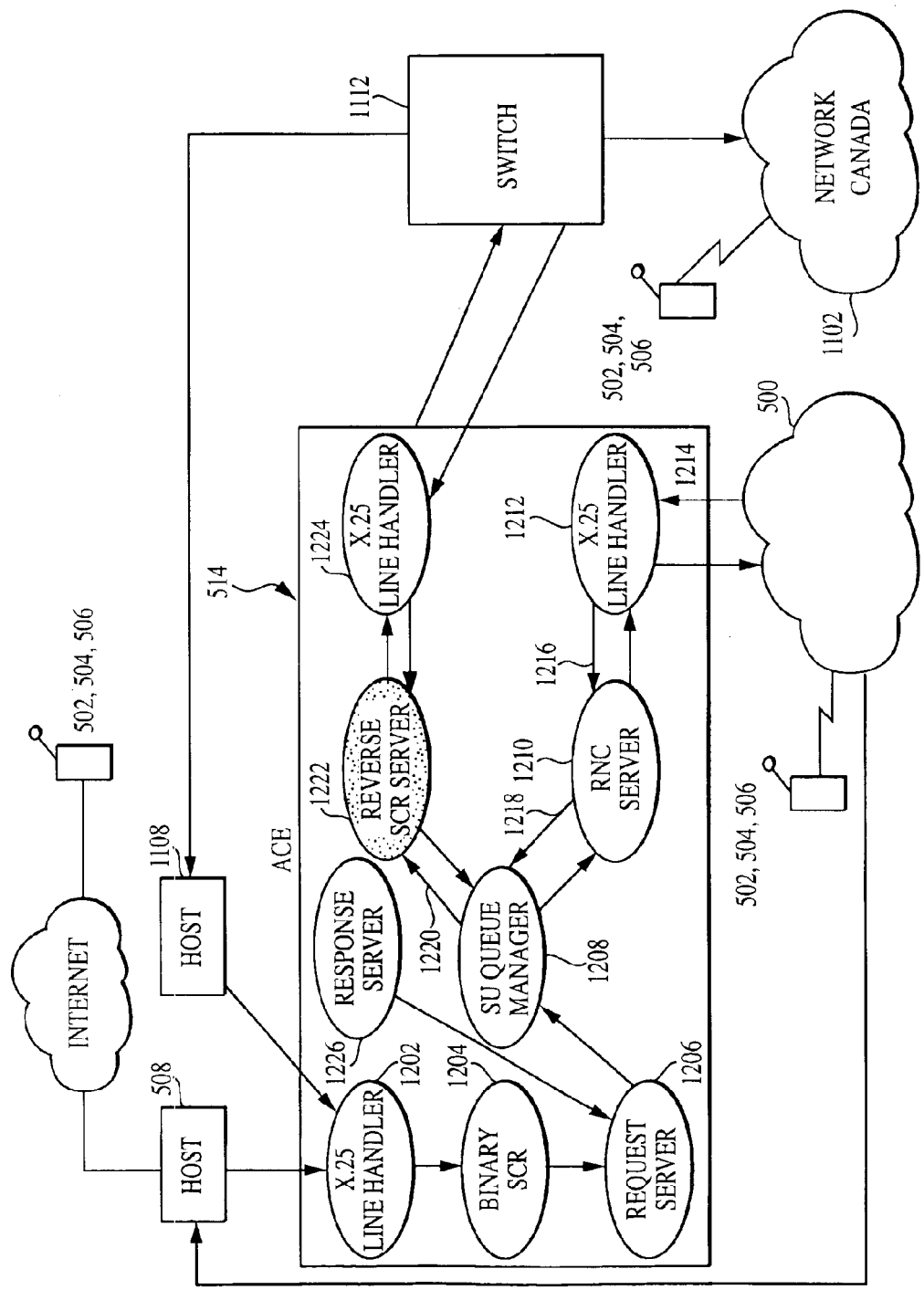
FIG. 12 is a representative simplified block diagram of a primary and a secondary network, which also illustrates an overview of the method according to the present invention.

Referring now to FIG. 12, a more detailed architecture of the system 1100 (and environments thereof) as contemplated by the present invention is shown. Details of the architecture of the present invention, the manner in which messages are processed, and how SUs 502, 504, 506 transmit and receive messages between the primary network and one or more secondary networks 1102 are explained herein.

A SU 502, 504, 506 that roams between the primary network 500, the secondary network 1102, and/or a satellite network 1106 will preferably be registered using standard procedures and/or real-time via standard identification procedures with each respective network. It should be further understood that the connection of the ACE 514 to switch 1112 is perceived by the secondary network 1102 as it would any other supported connection (e.g., X.25). That is, in accordance with one embodiment of the present invention, it is preferred that the ACE 514 appear as a host to a switch 1112 (or equivalent thereof) of a complementary network (e.g., 1102 and or 1106).

In operation, it is preferred that a message is sent from a SU 502, 504, 506 and received by host computer 508 via any of the network 500 supported line protocols (e.g., X.25). The line handler 1202 passes the message to an appropriate protocol converter which, in this example, is a binary Standard Context Routing (SCR) 1204 converter. Binary SCR can be used in host based routing when a SU 502, 504, 506 sends messages to and/or receives messages from a host computer 508 connected to the network 500. Host based routing is generally used for applications which require a central repository of information or on-line service. This type of routing assumes that the host computer 508 server is in a fixed location and that the host computer 508 application(s) compliments the client application—usually by providing more complex processing. It is preferred that the host computer 508 is connected to the ACE 514 through one of a variety of supported protocols (for example SNA LU6.2 or X.25). The physical connection to the ACE 514 can be, for example, a leased line.

When a message is received from a SU 502, 504, 506 and subsequently transmitted from the host computer 508 to a receiving SU 502, 504, 506, SCR can be used for routing that message through the network 500. SCR is an application header which flows between customer host 508 and the network 500. This header is preferably placed at the beginning of the user data. SCR provides for message control and delivery acknowledgment, and can be used with the SNA LU 6.2 and X.25 protocols. Other standard application headers may alternatively be used that performs or provides the functionality and/or data described herein.

It is preferred that there are at least three types of SCR message headers: Basic Inbound (IB), Basic Acknowledgement (AB), and Basic outbound (BO). The IB header is preferably created in the customer host 508 application software or communications software and flows from the customer host 508 to the network 500. The network 500 then directs the message to the appropriate SU 502, 504, 506. The AB header is created by the network 500 and is sent to the customer host 508. An AB header notifies the customer host 108 that the message sent to a SU 502, 504, 506 was successfully delivered. The OB header is created by the network 500 for messages sent to the customer host 508 from a SU 502, 504, 506. Further information pertaining to the SCR protocol and the Motient[SM] network can be found in the following documents: *ARDIS Network Connectivity Guide*, June 1994; *DataTAC Wireless Data Networks: Application Development Guide* (Doc. No. 6804111L20-A), First Edition, November 1997; *DataTAC Open Protocol Specifications Standard Context Routing Release* 1.0 (Doc. No. 68P04025C20-A), November 1995); *ARDIS DataTAC 4000 Software Developers Reference Guide*, Revision 2.0, January 1997. Each of the aforementioned documents are incorporated herein by reference in their entirety. Copies of these documents are submitted herewith. Other standard message headers may alternatively be used providing the functionality and/or data described herein.

At 1204, the SCR header is removed and an internal network 500 control header is added. The message is forwarded to a request server 1206, which reads the SU 502, 504, 506 profile, and the primary and secondary network (e.g., network(s) 500 and/or 1102 and/or 1106) information is then added to the internal ACE 514 header.

The message is then routed to an assigned SU queue manager 1208, where the message is queued. If no other messages are queued, the SU queue manager 1208 routes the message to the primary destination which, in this example, is the RNC Server 1210. The RNC server 1210 adds the appropriate radio frequency (RF) header for RF transmission, and routes the message to the configured X.25 line handler 312 corresponding to the RNC associated with, for example, the current location of designated SU 502, 504, 506. As shown in FIG. 5, the ACE 514 is actually a part of the Motient[SM] network 500. Here, the ACE 514, via line handler 1212, transmits the message to, for example, a RF/NCP 512.

If, after a predetermined number of attempts the message cannot be delivered, the network 500 returns, for example, a NAK 1214 message to the X.25 line handler 1212. The line handler 1212 then routes (indicated by arrow 1216) the NAK 1214 back to the RNC server 1210, where the RF Header is removed.

The RNC Server 1210 then routes the message back to the SU queue manager 1208, where the original message was queued. The SU queue manager 1208 then routes the message 1220 to the available secondary destination. This secondary destination could be, for example, complementary network 1102. In this case, the message is routed to the reverse SCR server 1222, which adds appropriate headers to the message so that the network 500 looks like a customer host to the complementary network 1102 and/or 1106.

Specifically, the reverse SCR server 1222 adds the appropriate IB SCR message header and forwards the message to the configured X.25 Line Handler 1224, which can send the message to, for example, switch 1112, which preferably views the connection as it would a standard host connection. Switch 1112 can then route the message to the network 1102 as it would any other message to the designated SU 502, 504, 506. As discussed with regard to FIG. 14, the response server 1220 is operatively communicable with the reverse SCR server 1206. The response server 1220 manages any ACK and NAK messages between the network 500 and any complementary network(s) 1102.

A SU 502, 504, 506 in a complementary network 1102 and/or 1106 can also transmit to a SU in the primary network 500. In this case, the complementary network 1102 and/or 1106, in effect, becomes functionally equivalent to the primary network 500. As such, switch 1112 (or equivalent thereof) may need to be physically and/or logically modified to provide functionality similar to, or substantially similar to, the ACE 514 That is, when the primary network 500 transmits to a secondary network 1102 or 1106, no modification of the secondary network(s) 1102 and/or 1106 are required since the primary network appears as any other host would to the secondary network(s). However, when the secondary network 1102 and/or 1106 is transmitting to the primary network, and also wants to provide the features of the present invention to its associated or registered SUs or customers, the secondary network may be required to have a functionality similar to the ACE 514 to enable SU 502, 504, 506 to transmit a message between the designated secondary network (e.g., 1102) and one or more other networks (e.g., 500 and/or 1106).

While the above description has focused one specific network configuration, other network configurations are possible and may be used with the present invention to implement the functionality and features described herein. For example, instead of using a host-based routing scheme as described above, the ACE 512 may also route from a first SU 502, 504, 506 to a receiving Su 502, 504, 506 in the complementary network 1102 and/or 1106, without using a host computer 1108, by using a conventional e-mail protocol such as the Post Office Protocol (e.g., POP3, POP 4, etc.) or Simple Mail Transfer Protocol (SMTP). In this case, the Reverse SCR server 1222 can utilize, for example, the POP3 and/or POP 4 and/or SMTP protocol, rather than the SCR.

In addition, a wireless transmission may be utilized between the primary network 500 and the secondary network 1102. In this case, the Reverse SCR Server 1222 can utilize, for example, the wireless Message Generator (MG) application user header, as described in the above-referenced *ARDIS DataTAC 4000 Software Developers Reference Guide*, Revision 2.0, January 1997. Similarly, the Reverse SCR Server 1222 can convert from a first RF protocol used by the primary network to a second RF protocol used by the secondary network 1102 and/or 1106, and/or utilize the second RF protocol when transmitting to the secondary network 1102 and/or 1106.

Figure 13:
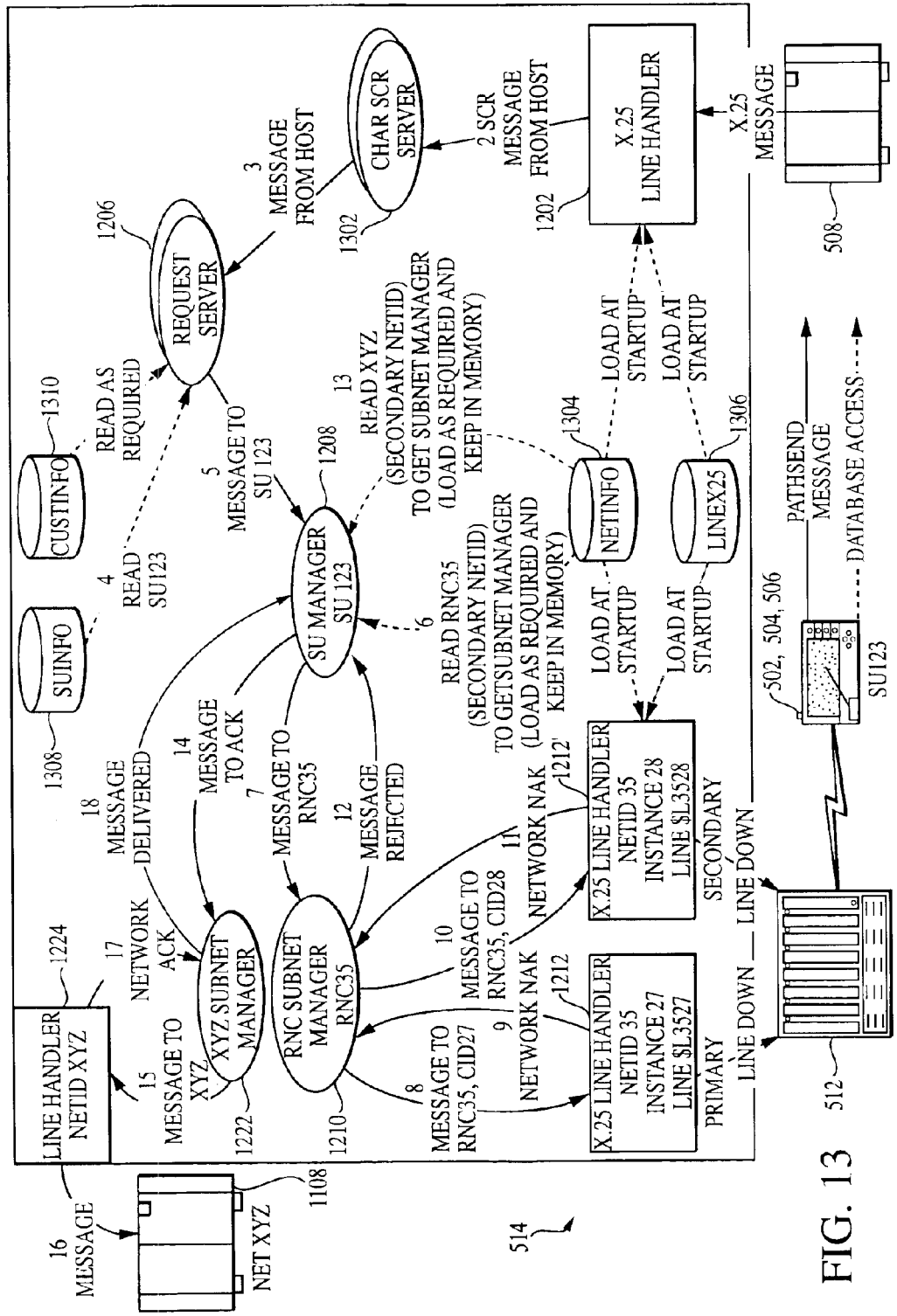
FIG. 13 is a more detailed block diagram of FIG. 12.

FIG. 13 shows a more detailed view of FIG. 12. Customer host computer 508 may be, for example, a mainframe computer, mini computer, micro computer, and the like. It should be understood that a message can also enter the ACE 514 from the network 500 via normal message transmission as discussed with regard to FIG. 5. The normal flow from host computer 508 to SU 502, 504, 506 occurs when a X.25 line handler 1202, for example, detects an incoming message (1). Other line handlers can also be provided (e.g., TCP/IP line handlers, LU 6.2 line handlers, and the like). Line handler information is preferably loaded as needed from database 1305. Similarly, network information is also preferably loaded at startup 1304. The line handler 1202 generally determines which protocols) the customer host 508 uses to communicate with the ACE 514. For example, as previously discussed, the customer host 508 can talk to the ACE 514 through either character SCR or binary SCR, which are protocols that allows the host to, for example, specify the receiving/destination SU.

Character SCR server 1302 reads the incoming message (2) and associated SCR headers to determine what SU 502, 504, 506 the message is to be delivered to. Request server 1206 receives the message (3) and ensures that the desired SU 502, 504, 506 exists (4). In one embodiment, such information can be stored, for example, in one or more databases. For example, the SU information database 1308 can store all valid SU identification numbers (IDs). The customer information database 1310 can store the type and level of service provided to each customer and/or SU, and/or data pertaining to usage fees and/or billing (6). The request server 1206 also ensures that the host computer 508 can communicate with the intended SU 502, 504, 506.

The SU queue manager 1208 determines which network(s) (e.g., network 500 and/or 1102 and/or 1106 shown in FIG. 11) the SU 502, 504, 506 is registered to. In the case the SU 502, 504, 506 is identified as SU 123 (5), the SU registered to the network 500. The message is transmitted (7) to a RNC server 1210, which may, for example, place appropriate transmission headers on the message. The message (8) is then sent to the network 500 via, for example, an X.25 line handler 1212 (or 1212'). More than two line handlers may be provided. It is also preferred that when two or more line handlers are provided (e.g., line handlers 1212 and 1212'), they receive/transmit messages on a round-robin basis, so that there is substantially equal message traffic passing over line handler 1212, 1212'. As shown, the line handlers 1212, 1212' are operatively connected to and communicable with the RNC subnet manager 1210.

In the event the intended SU 502, 504, 506 is not available, the RF/RNC 512 will send a NAK (9) to the primary X.25 line handler 1212 and subsequently to the RNC server 1210. In the event that the primary line handler is down, the message can be sent via a secondary line handler 1212' (10). In the event the intended SU 502, 504, 506 is not available, the RF/RNC 512 can send a NAK (11) to the secondary X.25 line handler 1212' and subsequently to the SU queue manager (12).

The SU queue manager 1208 receives notification (12) that the message has been rejected (e.g., a NAK message), and determines other available alternatives to send the message. Once another network 1102 is identified from, for example, database 1304 (13), the SU queue manager 1208 sends the message to the reverse SCR server 1222 (14) which places the message into the protocol that is utilized by the complementary network 1102. The message is then transmitted (15) by, for example, an X.25 line handler 1224 (16) to, for example, a switch 1112 associated with the complementary network(s) (shown in FIG. 11). It is preferred that the complementary network 1102 send an acknowledgement (ACK) message (17, 18) back to the primary network 500 that indicates that the message has been successfully delivered to the desired complementary network 1102. In the event that the message is not successfully delivered, the SU queue manager 1208 can repeat the process with the same or another complementary network that the SU 502, 504, 506 is registered to.

In the case of an e-mail message transmitted from a SU in the primary network to a SU in the secondary network, the host 508 may be, for example, a server associated with the e-mail service. If a SU 502, 504, 506 in the primary network substantially covering, for example, the United States, sends an e-mail message to a SU 502, 504, 506 in the secondary network substantially covering, for example, Canada, the secondary network switch 1112 (or equivalent) will recognize that the receiving SU 502, 504, 506 is registered in Canada. The secondary network switch 1112 can then transmit the message to the intended SU 502, 504, 506 via the normal secondary network transmission process.

SUs 502, 504, 506 can also use the complementary network 1102 to transmit message traffic to the primary network 500. In this case, the host 508' receives, for example, an e-mail message from a SU 502, 504, 506 in the secondary network 1102. The host 508' may also optionally be connected to another network such as the internet. Once the host 508' receives the e-mail, the host 508', preferably having substantially the same functionality as the ACE 514 as described herein, routes the message to the intended SU 502, 504, 506 in the primary network 500 via the host computer 108 and ACE as previously discussed.

Another embodiment of the present invention contemplates the use of a bridge connection between the primary 500 and secondary 1102 networks, so that the interface that connects the respective primary network 500 and secondary network 1102 to the bridge have the same address.

Figure 14:
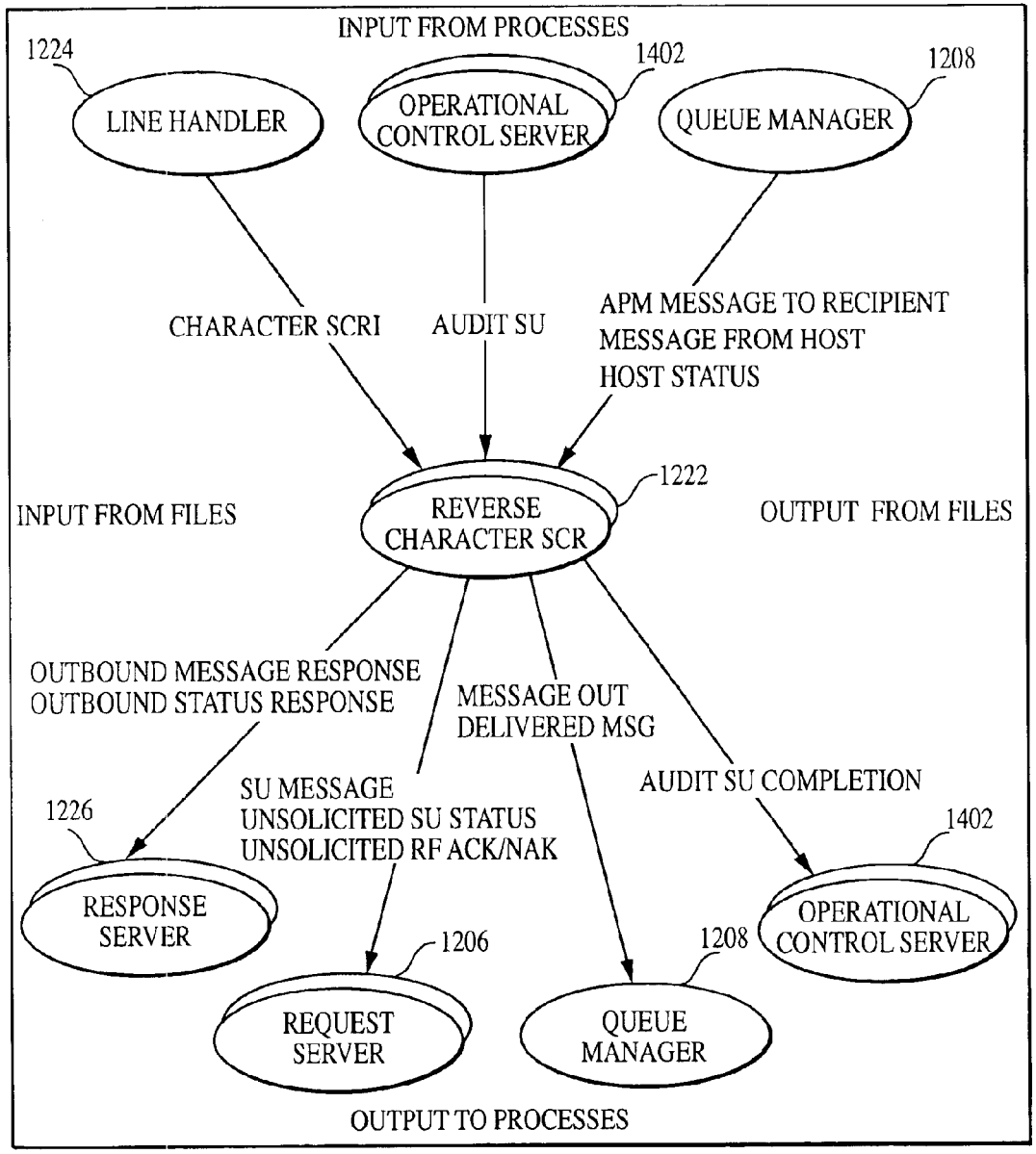
FIG. 14 is an overview of the inputs to and outputs from the Reverse SCR server according to the present invention.

FIG. 14 shows an overview of the inputs to, and outputs from, the reverse SCR server 1222 according to the present invention. As shown, line handler 1224 provides as input a message to the reverse SCR server 1222. The character SCR indicates the character SCR protocol is being used. However, any other suitable communication protocols) can be used and practiced with the principles according to the present invention. The operational control server 1402 allows a system operator administrator to, for example, issue an audit su command which obtains the status of the network and messages being transmitted thereon (e.g., how many messages are currently flowing over the network, types of messages, NAKs, ACKS, etc). The queue manager 1208 can provide an apm message to recipient message, which indicates a device-to-device (e.g., SU to SU) type message. The message from host indicates that any type message has been received from a customer host 508. The host status can be used to indicate, for example, the status of the modem of a host computer 508.

The response server 1226 handles all of the ACK and NAK messages between the network 500 and any complementary network(s) 1102 and/or 1106, as indicated by the outbound message response and outbound status response. The queue manager receives an indication from the reverse SCR server 1222 when messages have been transmitted (message out) and when a message has been successfully delivered (delivered msg). Finally, the operational control server 1402 receives a message (audit su completion) from the reverse SCR server 1402 when the audit process referred to above has been completed.

Figure 15A:
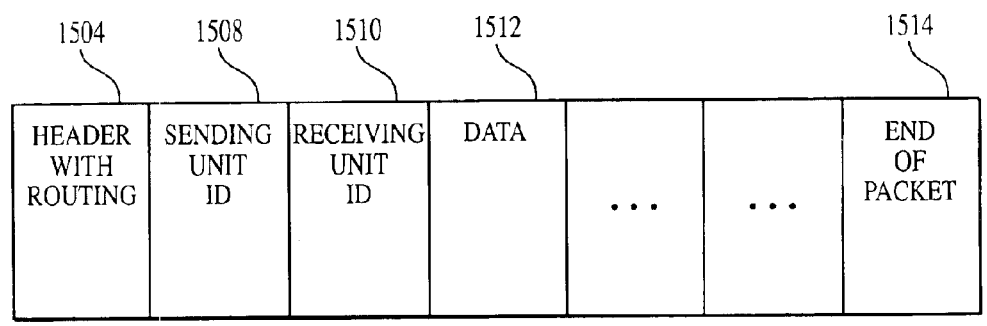
FIG. 15a shows an example of a first data format that may be transmitted from the primary network to the complementary network.
Figure 15B:
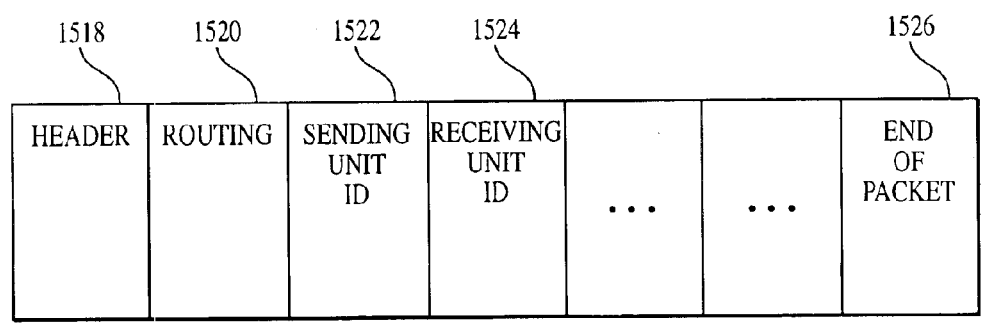
FIG. 15b shows an example of a second data format that may be transmitted from the primary network to the secondary network.

Advantageously, in accordance with one embodiment of the present invention, the reverse SCR server 1222 can optionally convert the received data from a variety of data transmission protocols, and can optionally convert or obtain the correct data from a variety of data formats. For example, as illustrated in FIGS. 15a and 15b, while the same data is transmitted, a different data ordering can be used. Thus, the reverse SCR server 1222 is equipped with different data format/communication protocols to accept the data in an appropriate manner. Alternatively, or in addition thereto, the reverse SCR server 1222 includes the capability of receiving, converting and/or transmitting different data protocols.

More particularly, as shown in FIG. 15a, a first message protocol is shown 1500. The header and routing field 1504 may be followed by a sending unit ID field 1508 and a receiving unit ID field 1510. Finally, the protocol may have one or more data fields 1512, which are followed by an end of packet field 1514. In FIG. 15b, the second protocol may comprise 1516 a header field 1518, followed by a routing field 1520, a sending unit ID field 1522, a receiving unit ID field, one or more data fields, and an end of packet field. The reverse SCR server 1222 may use one or more protocol conversions to interpret and transmit the message using the different data format in FIGS. 15a and 15b from one network to another (e.g., network 500 to network 1102 and/or 1106). Reverse SCR server 1222 may optionally utilize the message header as the means or the method in determining the different data protocols to be utilized.

Figure 16A:
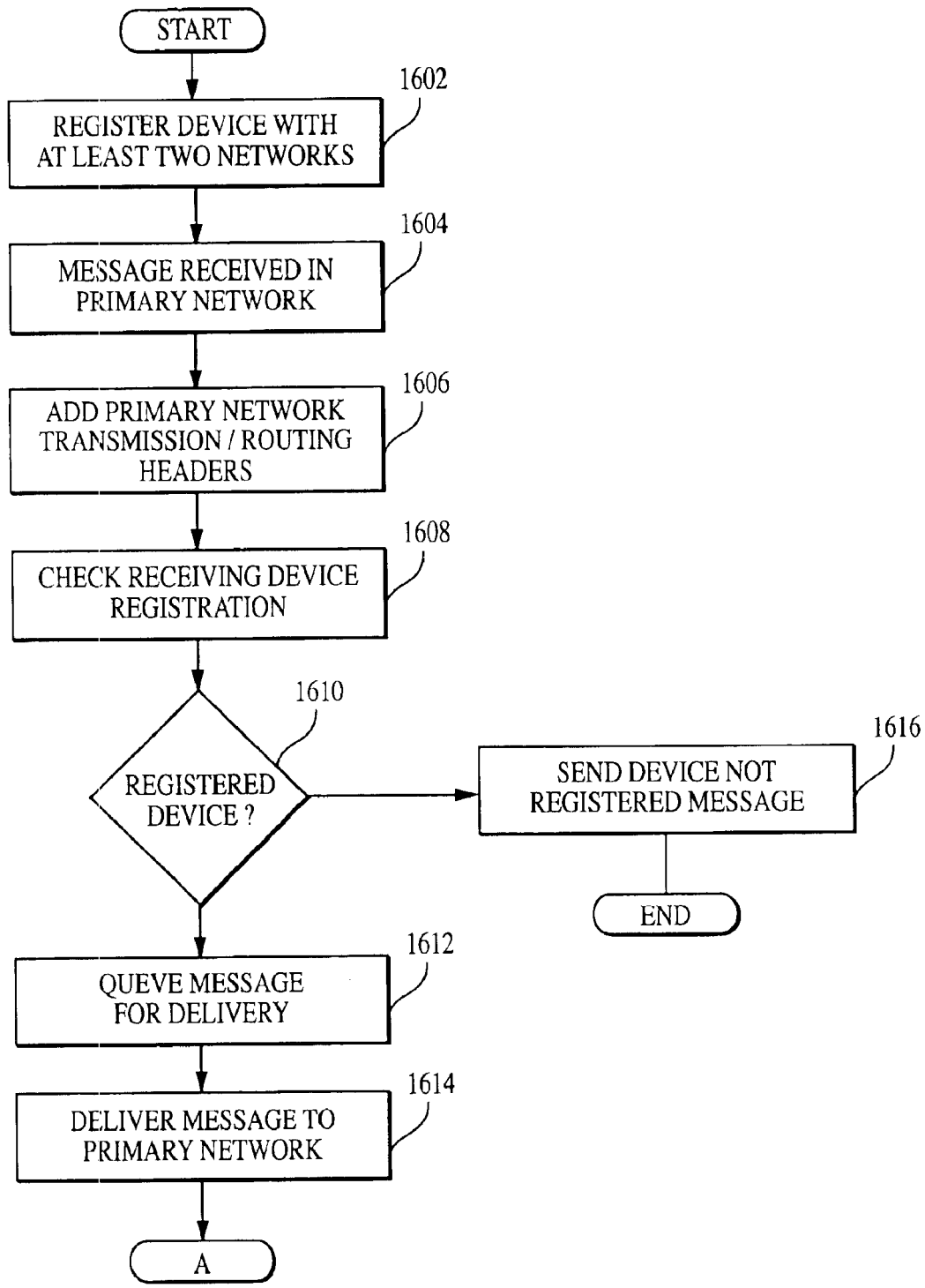
FIGS. 16a and 16b, taken together, is a flowchart of the process for transmitting data to a SU that can travel between two or more networks in accordance with the present invention.
Figure 16B:
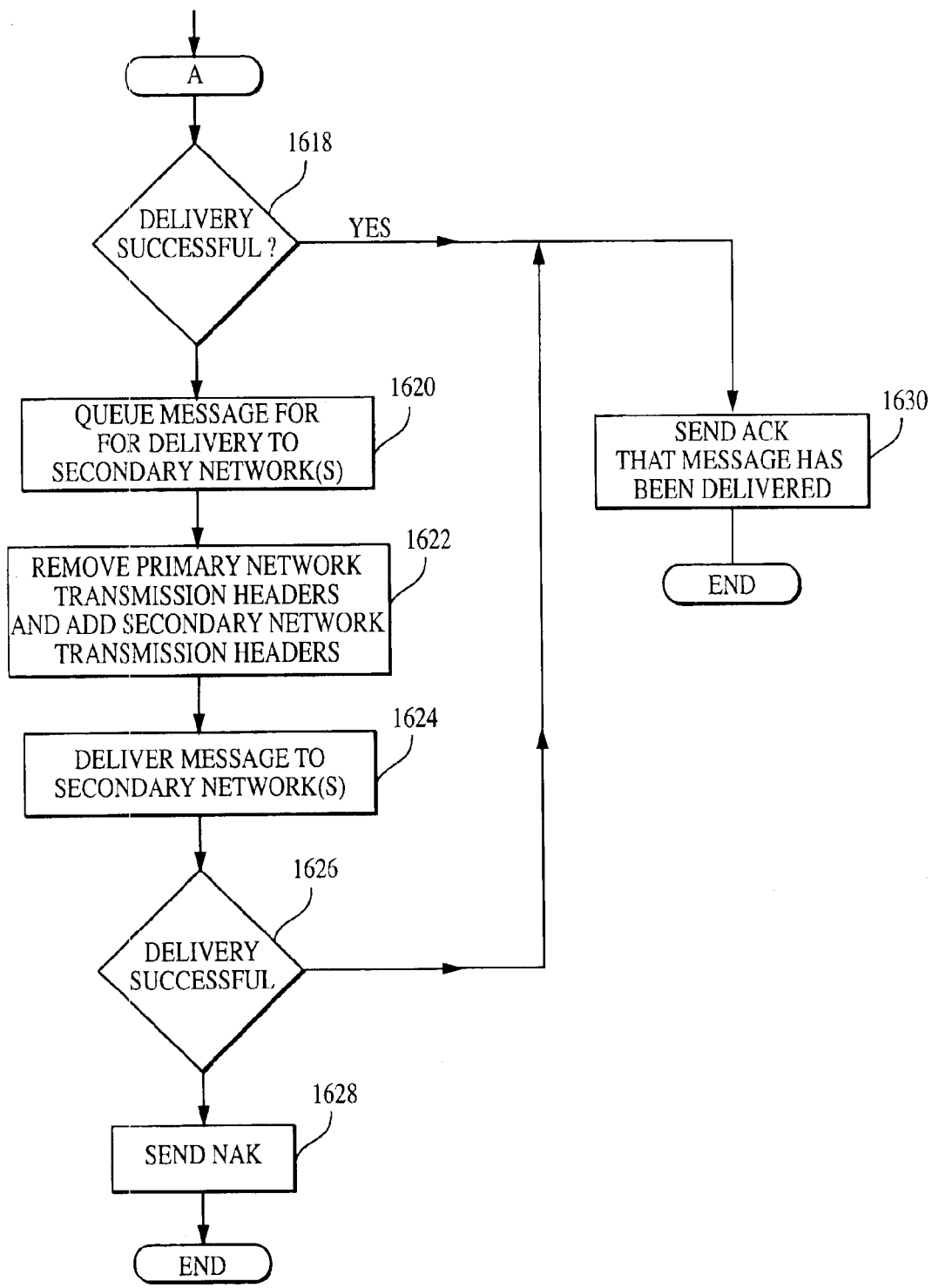

FIGS. 16a and 16b, taken together, is a flowchart of the process for transmitting data to a device that can communicate between two or more networks in accordance with the present invention. In step 1602, SUs are registered with the networks (e.g., primary network 500 and/or secondary network 1102 and/or satellite network 1106) in which they may communicate. The registration or communication is preferably done in accordance standard registration processes for each respective network. Such registration information may be stored in the SU information database 1308, as previously discussed.

A message is then received in the primary network 1604 (e.g., network 500), after which time internal transmission and/or routing headers for the primary network are added to the message 1606, and the intended SU 502, 504, 506 that is to receive the message is registered to at least the primary network 500 and any secondary network(s) (e.g., secondary network 1102) 1608.

If it is determined that the device is not registered 1610, a device not registered message (or equivalent) is transmitted back to the originating SU 502, 504, 506 via the originating network. If it is determined that the device is registered, 1610, the message is queued for delivery 1612, and subsequently delivered to the primary network that is currently processing the message. If the message has been successfully delivered to the intended SU(s) 502, 504, 506 in the primary network, an ACK message is preferably send to the sending SU. If the message has not been successfully delivered, then the message is queued for delivery to one or more secondary networks with which the receiving SU 502, 504, 506 is registered 1620. Any transmission and/or routing headers for the primary network are removed, and appropriate headers for transmission to a secondary network are added 1622. The message is then delivered to a designated secondary network 1624, preferably in accordance with the information provided in a database such as SUINFO database 1308. Steps 1620, 1622 and 1624 can be repeated for each secondary network to which the intended receiving SU is registered. In addition, steps 1620, 1622 and 1624 can be repeated in sequence for each network, or in parallel for each network.

If the message delivery is successful 1626, an ACK message can be sent to the secondary network, primary network and/or sending SU 502, 504, 506 that the message has been delivered. If after an attempt has been made to deliver the message to all secondary networks to which the receiving SU 502, 504, 506 is registered, a NAK message can be sent to the sending SU 502, 504, 506 that the message was not delivered.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention. While the foregoing invention has been described in detail by way of illustration and example of preferred embodiments, numerous modifications, substitutions, and alterations are possible without departing from the scope of the invention defined in the following claims.

What is claimed is:

1. A system enabling a first device operatively communicable with at least a first wireless network to transmit a data message to at least one wireless device operatively communicable with said first wireless network and at least a second wireless network, said system comprising:
   a host computer, operatively communicable with said first wireless network, capable of receiving a data message from the first device;
   said first wireless network comprising a routing switch that;
   receives the data message from said host computer;
   reads a profile of the at least one wireless device, the profile comprising data pertaining to at least a primary network and a secondary network to which the at least one wireless device is registered with, wherein the primary network and secondary network are said first wireless network and said second wireless network, respectively;
   adds a radio frequency header to the message;
   transmits the message to said at least one wireless device in the primary network and, after a predetermined number of transmission attempts, receives a negative acknowledgement message from the primary network;
   adds a message transmission header in accordance with the protocol used by the secondary network; and
   transmits the message to the secondary network; and
   a switch operatively communicable with the secondary network for receiving the message transmitted by said routing switch and transmitting the message to at least one of said at least one wireless device via the secondary network.

2. The system according to claim 1, wherein said routing switch queues each message prior to transmitting to said at least one second wireless network.

3. The system according to claim 1 wherein said switch receives a negative acknowledgement message from the secondary network.

4. The system according to claim 1 wherein the first device is a wireless device registered with at least said first wireless network.

5. The system according to claim 1 wherein the first device is a non-wireless device registered with at least said first wireless network.

6. A system enabling a first device operatively communicable with at least a first wireless network to transmit a data message to at least one wireless device operatively communicable with said first wireless network and at least a second wireless network, said system comprising:
   a first wireless network comprising a routing switch that:
   receives the data message from the first device;
   reads a profile of the at least on wireless device, the profile comprising data pertaining to at least a primary network and a secondary network to which the at least one wireless device is registered with, wherein the primary network and secondary network are said first wireless network and said second wireless network, respectively;

adds a radio frequency header to the message;

transmits the message to said at least one wireless device in the primary network and, after a predetermined number of transmission attempts, receives a negative acknowledgement message from the primary network;

adds a message transmission header in accordance with the protocol used by the secondary network; and transmits the massage to the secondary network; and a switch operatively communicable with the secondary network for receiving the message transmitted by said routing switch and transmitting the message to at least one of said at least one wireless device via the secondary network.

7. The system according to claim 6, wherein said routing switch queues each message prior to transmitting to said at least one second wireless network.

8. The system according to claim 6 wherein said switch receives a negative acknowledgement message from the secondary network.

9. The system according to claim 6 wherein the first device is a wireless device registered with at least said first wireless network.

10. The system according to claim 6 wherein the first device is a non-wireless device registered with at least said first wireless network.

11. A system for enabling a first device operatively communicable with at least a first wireless network to transmit a data message to at least one wireless device operatively communicable with said first wireless network and at least a second wireless network, said system comprising:

a host computers operatively communicable with said first wireless network, capable of receiving a data message from the first device;

said first wireless network comprising a routing switch comprising:

an internal routing server that receives the message from said host computer and attaches to the message transmission headers for internal routing within said first wireless network;

a request server for reading a profile of the at least one wireless device, the profile comprising data pertaining to at least a primary network and a secondary network to which the at least one wireless device is registered with, wherein the primary network and secondary network are said first wireless network and said second wireless network, respectively;

a routing server operatively communicable with said request server for adding a radio frequency header to the message, transmitting the message to at least one of said at least one wireless device in the primary network and, after a predetermined number of transmission attempts, optionally receiving a negative acknowledgement message from the primary network and transmitting the negative acknowledgement message to said routing server;

a complementary network server for receiving the message from said routing server and adding a message transmission header in accordance with the protocol used by the secondary network; and a switch operatively communicable with the secondary network for receiving the message transmitted by said complementary network server and transmitting the message to said at least one wireless device via the secondary network.

12. The system according to claim 11, wherein said routing switch further comprises a message queue operatively communicable with at least one of said request server, said routing server, and said complementary network server that manages the flow of each message from said at least one first wireless network to said at least one second wireless network.

13. The system according to claim 11 wherein said switch comprises:

a second routing sewer for adding a radio frequency header to the message and transmitting the message to the secondary network and, after a predetermined number of transmission attempts, optionally receiving a negative acknowledgement message from the secondary network.

14. The system according to claim 11 wherein the first device is a wireless device registered with at least said first wireless network.

15. The system according to claim 11 wherein the first device is a non-wireless device registered with at least said first wireless network.

16. A system for enabling a first device operatively communicable with at least a first wireless network to transmit a data message to at least one wireless device operatively communicable with said first wireless network and at least a second wireless network, said system comprising:

a first wireless network comprising a routing switch comprising:

an internal routing sewer that receives the message and attaches to the message transmission headers for internal routing within said first wireless network;

a request server for reading a profile of the at least one wireless device, the profile comprising data pertaining to at least a primary network and a secondary network to which the at least one wireless device is registered with, wherein the primary network and secondary network are said first wireless network and said second wireless network, respectively;

a routing sewer operatively communicable with said request server for adding a radio frequency header to the message, transmitting the message to at least one of said at least one wireless device in the primary network and, after a predetermined number of transmission attempts, optionally receiving a negative acknowledgement message from the primary network and transmitting the negative acknowledgement message to said routing server;

a complementary network sewer for receiving the message from said routing server and adding a message transmission header in accordance with the protocol used by the secondary network; and a switch operatively communicable with the secondary network for receiving the message transmitted by said complementary network server and transmitting the message to said at least one wireless device via the secondary network.

17. The system according to claim 16, wherein said routing switch further comprises a message queue operatively communicable with at least one of said request server, said routing server, and said complementary network server that manages the flow of each message from said at least one first wireless network to said at least one second wireless network.

18. The system according to claim 16 wherein said switch comprises:
a second routing server for adding a radio frequency header to the message and transmitting the message to the secondary network and, after a predetermined number of transmission attempts, optionally receiving a negative acknowledgement massage from the secondary network.

19. The system according to claim 16 wherein the first device is a wireless device registered with at least said first wireless network.

20. The system according to claim 16 wherein the first device is a non-wireless device registered with at least said first wireless network.

21. A system for enabling a first device operatively communicable with at least a first wireless network to transmit a data message to at least one wireless device operatively communicable with said first wireless network and at least a second wireless network, said system comprising:
a host computer, operatively communicable with said first wireless network, capable of receiving a data message from the first device;
said first wireless network comprising a routing switch comprising:
at least a first line handler for receiving the data message from said host computer;
a request server for reading a profile of the at least one wireless device, the profile comprising data pertaining to at least a primary network and a secondary network to which the at least one wireless device is registered with, wherein the primary network and secondary network are said first wireless network and said second wireless network, respectively;
a routing server operatively communicable with said request server for adding a radio frequency header to the message;
at least a second line handler for receiving the message from said routing server and transmitting the message to at least one of said at least one wireless device in the primary network and, after a predetermined number of transmission attempts, receiving a negative acknowledgement message from the primary network and transmitting the negative acknowledgement message to said rotating server;
a complementary network server for receiving the message from said routing server and adding a message transmission header in accordance with the protocol used by the secondary network; and
at least a third line handler for receiving the message from said complementary network server mid transmitting the message to the secondary network; and
a switch operatively communicable with the secondary network for receiving the message transmitted by said third line handler and transmitting the message to at least one of said at least one wireless device via the secondary network.

22. The system according to claim 21, wherein said routing switch further comprises a message queue operatively communicable with at least one of said request server, said routing server, and said complementary network server that manages the flow of each massage from said at least one first wireless network to said at least one second wireless network.

23. The system according to claim 21 wherein said switch comprises:
a second routing server for adding a radio frequency header to the message; and
at least a fourth line handler for receiving the message from said second routing server and transmitting the message to the secondary network and, after a predetermined number of transmission attempts, optionally receiving a negative acknowledgement message from the secondary network.

24. The system according to claim 21 wherein the first device is a wireless device registered with at least said first wireless network.

25. The system according to claim 21 wherein the first device is a non-wireless device registered with at least said first wireless network.

26. A system for enabling a first device operatively communicable with at least a first wireless network to transmit a data message to at least one wireless device operatively communicable with said first wireless network and at least a second wireless network, said system comprising:
a first wireless network comprising a routing switch comprising:
at least a first line handler for receiving the data message;
a request server for reading a profile of the at least one wireless device, the profile comprising data pertaining to at least a primary network and a secondary network to which the at least one wireless device is registered with, wherein the primary network and secondary network are said first wireless network and said second wireless network, respectively;
a routing saver operatively communicable with said request server for adding a radio frequency header to the message;
at least a second line handler for receiving the message from said routing server and transmitting the message to at least one of said at least one wireless device in the primary network and, after a predetermined number of transmission attempts, receiving a negative acknowledgement message from the primary network and transmitting the negative acknowledgement message to said routing server;
a complementary network server for receiving the message from said routing server and adding a message transmission header in accordance with the protocol used by the secondary network; and
at least a third line handler for receiving the message from said complementary network server and transmitting the message to the secondary network; and
a switch operatively communicable with the secondary network for receiving the message transmitted by said third line handler and transmitting the message to at least one of said at least one wireless device via the secondary network.

27. The system according to claim 26, wherein said routing switch further comprises a message queue operatively communicable with at least one of said request server, said routing server, and said complementary network server that manages the flow of each message from said at least one first wireless network to said at least one second wireless network.

28. The system according to claim 26 wherein said switch comprises:
a second routing sewer for adding a radio frequency header to the message; and at least a fourth line handler for receiving the message from said second routing server and transmitting the message to the secondary network and, after a predetermined number of transmission attempts, optionally receiving a negative acknowledgement message from the secondary network.

29. The system according to claim 26 wherein the first device is a wireless device registered with at least said first wireless network.

30. The system according to claim 26 wherein the first device is a non-wireless device registered with at least said first wireless network.

31. A system enabling a first device operatively communicable with at least a first wireless network to transmit a data message to at least one wireless device operatively communicable with said first wireless network and at least a second wireless network, said system comprising:
a first wireless network comprising a routing switch that:
a) receives the data message;
b) reads a profile of the at least one wireless device, the profile comprising data pertaining to at least a primary network and a secondary network to which the at least one wireless device is registered with, wherein the primary network and secondary network are said first wireless network and said second wireless network, respectively;
c) determines at least one of the primary and secondary network at which the last message was received by the at least one wireless device;
d) adds a radio frequency header to the message in accordance with the network as determined in c);
e) transmits the message to said at least one wireless device in the network as determined in c) and, after a predetermined number of transmission attempts, receives a negative acknowledgement message;
f) adds a message transmission header in accordance with the protocol used by at least one of the primary and secondary network to which the message has not yet been transmitted; and
g) transmits the message to the at least one wireless device in network as determined in f); and
a switch operatively communicable with the secondary network for receiving the message transmitted by said routing switch at at least one of e) and g).

32. A method for enabling a first device operatively communicable with at least a first wireless network to transmit a data message to at least one wireless device operatively communicable with the first wireless network and at least a second wireless network, said method comprising the steps of:
transmitting a message from the first device to at least the first wireless network;
reading a profile of the at least one wireless device, the profile comprising data pertaining to at least a primary network and a secondary network to which the at least one wireless device is registered with, wherein the primary network and secondary network are said first wireless network and said second wireless network, respectively;
adding a radio frequency header to the message;
transmitting the message to at least one of said at least one wireless device in the primary network and, after a predetermined number of transmission attempt, optionally receiving a negative acknowledgement message from the primary network;
adding a message transmission header in accordance with the protocol used by the secondary network;
transmitting the message to the secondary network; and
receiving the message at the secondary network and further transmitting the message to at least one of said at least one wireless device via the secondary network.

33. The method according to claim 32, further comprising the step of queuing each message prior to transmitting to the at least one second wireless network.

34. The method according to claim 32 wherein the secondary network generates a negative acknowledgement message subsequent to determining that the message cannot be delivered.

35. The method according to claim 32 wherein the first device is a wireless device registered with at least the first wireless network.

36. The method according to claim 32 wherein the first device is a non-wireless device registered with at least the first wireless network.

37. A method for enabling a first device operatively communicable with at least a first wireless network to transmit a data message to at least one wireless device operatively communicable with the first wireless network and at least a second wireless network, said method comprising the steps of:
a) transmitting a message from the first device to at least the first wireless network;
b) reading a profile of the at least one wireless device, the profile comprising data pertaining to at least a primary network and a secondary network to which the at least one wireless device is registered with, wherein the primary network and secondary network are said first wireless network and said second wireless network, respectively;
c) determining at least one of the primary and secondary network at which the last message was received by the at least one wireless device;
d) adding a radio frequency header to the message in accordance with the network as determined in said step c);
e) transmitting the message to said at least one wireless device in the network as determined in said step c) and, after a predetermined number of transmission attempts, receiving a negative acknowledgement message;
f) adding a message transmission header in accordance with the protocol used by at least one of the primary and secondary network to which the message has not yet been transmitted; and
g) transmitting the message to the at least one wireless device in network as determined in said step f).

38. A method for enabling a first device operatively communicable with at least a first wireless network to transmit a data message to at least one wireless device operatively communicable with die first wireless network and at least a second wireless network, said method comprising:
transmitting a message from the first wireless device to at least the first wireless network;
attaching to the message transmission headers for internal routing within the first wireless network;
reading a profile of the at least one wireless device, the profile comprising data pertaining to at least a primary network and a secondary network to which the at least one wireless device is registered with, wherein the primary network and secondary network are said first wireless network and said second wireless network, respectively;

adding a radio frequency header to the message;

transmitting the message to at least one of the at least one wireless device in the primary network and, after a predetermined number of transmission attempts, optionally receiving a negative acknowledgement message from the primary network;

adding a message transmission header in accordance with the protocol used by the secondary network; and transmitting the message to the at least one wireless device via the secondary network.

39. The method according to claim 38, further comprising the step of queuing messages prior to transmitting from the at least one first wireless network to the at least one second wireless network.

40. The method according to claim 38 further comprising the step of adding a radio frequency header to the message the secondary network and, after a predetermined number of transmission attempt, optionally receiving a negative acknowledgement message from the secondary network.

41. The method according to claim 38 wherein the first device is a wireless device registered with at least the first wireless network.

42. The method according to claim 38 wherein the first device is a non-wireless device registered with at least the first wireless network.

43. A method for enabling a first device operatively communicable with at least a first wireless network to transmit a data message to at least one wireless device operatively communicable with the first wireless network and at least a second wireless network, said method comprising the steps of:

transmitting a message from the first wireless device to a a host computer operatively communicable with said first wireless network;

providing at least a first line handler for receiving the data message from the host computer;

reading a profile of the at least one wireless device, the profile comprising data pertaining to at least a primary network and a secondary network to which the at least one wireless device is registered with, wherein the primary network and secondary network are said first wireless network and said second wireless network, respectively;

adding a radio frequency header to the message;

transmitting the message to at least one of said at leant one wireless device in the primary network and, after a predetermined number of transmission attempts, receiving a negative acknowledgement message from the primary network;

adding a message transmission header in accordance with the protocol used by the secondary network;

transmitting the message to the secondary network; and transmitting the message to at least one of said at least one wireless device via the secondary network.

44. The method according to claim 43, further comprising the step of queuing the message prior to transmission from the at least one first wireless network to the at least one second wireless network.

45. The method according to claim 43 further comprising the steps of:

adding at the secondary network a radio frequency header to the message; and transmitting the message to the secondary network and, after a predetermined number of transmission attempts, optionally receiving a negative acknowledgement message from the secondary network.

46. The method according to claim 43 wherein the first device is a wireless device registered with at least the first wireless network.

47. The method according to claim 43 wherein the first device is a non-wireless device registered with at least the first wireless network.

48. A communication system enabling communication devices to communicate across complimentary networks, comprising:

a first communication device transmitting a data message and communicating substantially consistent with a first communication format;

a first wireless network operatively connected to, and directly communicating with, said first communication device and receiving the data message, said first wireless network determining responsive to the data message whether the data message is to be transmitted within said first wireless network, and when the data message is to be transmitted within said first wireless network, formatting the data message to be received substantially consistent with the first communication format, routing the data message to a device destination within said first wireless network, and optionally via first wireless communication, and when the data message is not to be transmitted within said first wireless network, said first wireless network formatting the data message in accordance with a second communication format and routing the data message to a network destination, optionally via the first wireless communication;

a second communication device not capable of directly communicating with said first wireless network and communicating in accordance with the second communication format;

a second wireless network operatively connected to, and directly communicating with, said second communication device and said first wireless network, said second wireless network receiving the data message from the first wireless network as the network destination when the data message is not to be transmitted within said first wireless network, optionally via second wireless communication and routing the data message to said second communication device as the device destination responsive to said second communication format formatted by said fist wireless network.

49. The system according to claim 48 wherein the first communication device is a wireless device registered with at least said first wireless network.

50. The system according to claim 48 wherein the first communication device is a non-wireless device registered with at least said first wireless network.

51. A communication system enabling communication devices to communicate across complimentary networks, comprising:

a first communication device transmitting a data message and communicating substantially consistent with a first communication format;

a first wireless network operatively connected to, and directly communicating with, said first communication device and receiving the data message, said first wireless network determining responsive to the data message whether the data message is to be transmitted within said first wireless network, and when the data message is to be transmitted within said first wireless network, formatting the data message to be received substantially consistent with the first communication format, transmitting the data message to a device destination within said first wireless network, and optionally via first wireless communication, and when the data message is not to be transmitted within said first wireless network, said first wireless network formatting the data message in accordance with a second communication format and transmitting the data message to a network destination, optionally via the first wireless communication;

a second communication device not capable of directly communicating with said first wireless network and communicating in accordance with the second communication format;

a second wireless network operatively connected to, and directly communicating with, said second communication device and said first wireless network, said second wireless network receiving the data message from the first wireless network as the wireless network, optionally via second wireless communication and transmitting the data message to said second communication device as the device destination responsive to said second communication format formatted by said first wireless network.

52. The system according to claim 51 wherein the first communication device is a wireless device registered with at least said first wireless network.

53. The system according to claim 51 wherein the first communication device is a non-wireless device registered with at least said first wireless network.

54. A communication system enabling communication devices to communicate across complimentary networks, comprising:

a first communication device transmitting a data message and communicating in accordance with a first communication format;

a primary wireless network operatively connected to, and directly communicating with, said first communication device and receiving the data message, said primary wireless network determining responsive to the data message whether the data message is to be broadcast within said primary wireless network and outside said primary wireless network, and when the data message is to be broadcast within said primary wireless network, formatting the data message to be received in accordance with the first communication format, routing the data message to a device destination within said primary wireless network via first wireless communication, and when the data message is to be transmitted outside said primary wireless network, optionally in addition to the routing the data message within said primary wireless network, said primary wireless network formatting the data message in accordance with a second communication format and routing the data message outside said primary network;

a second communication device not capable of directly communicating with said primary wireless network and communicating in accordance with the second communication format;

a complimentary wireless network operatively connected to, and directly communicating with, said second communication device and said primarily wireless network, said complimentary wireless network receiving the data message from the primary wireless network and routing the data message to said second communication device responsive to said second communication format formatted by said primary wireless network.

55. The system according to claim 54 wherein the first communication device is a wireless device registered with at least said first wireless network.

56. The system according to claim 54 wherein the first communication device is a non-wireless device registered with at least said first wireless network.

57. A communication system enabling communication devices to communicate across complimentary networks, comprising:

a first communication device transmitting a data message and communicating in accordance with a first communication format;

a primary wireless network operatively connected to, and directly communicating with, said first communication device and receiving the data message, said primary wireless network determining responsive to the data message whether the data message is to be broadcast within said primary wireless network and outside said primary wireless network, and when the data message is to be broadcast within said primary wireless network, formatting the data message to be received in accordance with the first communication format, transmitting the data message to a device destination within said primary wireless network via first wireless communication, and when the data message is to be transmitted outside said primary wireless network, optionally in addition to the transmitting the data message within said primary wireless network, said primary wireless network formatting the data message in accordance with a second communication format and transmitting the data message outside said primary network;

a second communication device not capable of directly communicating with said primary wireless network and communicating in accordance with the second communication format;

a complimentary wireless network operatively connected to, and directly communicating with, said second communication device and said primarily wireless network, said complimentary wireless network receiving the data message from the primary wireless network and transmitting the data message to said second communication device responsive to said second communication format formatted by said primary wireless network.

58. The system according to claim 57 wherein the first communication device is a wireless device registered with at least said first wireless network.

59. The system according to claim 57 wherein the first communication device is a non-wireless device registered with at least said first wireless network.

60. A system enabling a first device operatively communicable with at least a first wireless network to transmit a data message to at least one wireless device operatively communicable with said first wireless network and at least a second wireless network, said system comprising:

means for processing, operatively communicable with said first wireless network, capable of receiving a data message from the first device;

said first wireless network comprising switching means that;

receives the data massage from said means for processing;

reads a profile of the at least one wireless device, the profile comprising data pertaining to at least a primary network end a secondary network to which the at least one wireless device is registered with, wherein the primary network and secondary network are said first wireless network and said second wireless network, respectively;

adds a radio frequency header to the message;

transmits the message to said at least one wireless device in the primary network and, after a predetermined number of transmission attempts, receives a negative acknowledgement message from the primary network;

adds a message transmission header in accordance with the protocol used by the secondary network; and transmits the message to the secondary network; and a switch operatively communicable with the secondary network for receiving the message transmitted by said switching means and transmitting the message to at least one of said at least one wireless device via the secondary network.

61. A system for enabling a first device operatively communicable with at least a first wireless network to transmit a data message to at least one wireless device operatively communicable with said first wireless network and at least a second wireless network, said system comprising:

means for processing, operatively communicable with said first wireless network, capable of receiving a data message from the first device;

said first wireless network comprising a routing switch comprising:

an internal routing server that receives the message from said means for processing and attaches to the message transmission headers for internal routing within said first wireless network;

a request server for reading a profile of the at least one wireless, device, the profile comprising data pertaining to at least a primary network and a secondary network to which the at least one wireless device is registered with, wherein the primary network and secondary network are said first wireless network and said second wireless network, respectively;

a routing server operatively communicable with said request server for adding a radio frequency header to the message, transmitting the message to at least one of said at least one wireless device in the primary network and, after a predetermined number of transmission attempts, optionally receiving a negative acknowledgement message from the primary network and transmitting the negative acknowledgement message to said routing server;

a complementary network server for receiving the message from said routing server and adding a message transmission header in accordance with the protocol used by the secondary network; and means for switching, operatively communicable with the secondary network, that receives the message transmitted by said complementary network server and transmits the message to said at least one wireless device via the secondary network.

62. In a data communication system having a first device operatively communicable with at least a first wireless network to transmit a data message to at least one wireless device operatively communicable with the first wireless network and at least a second wireless network, wherein the system has means for processing, operatively communicable with said first wireless network, capable of receiving a data message from the first device, and wherein the first wireless network has: a routing switch having an internal routing server that receives the message from the means for processing and attaches to the message transmission headers for internal routing within the first wireless network, a request server for reading a profile of the at least one wireless device, the profile comprising data pertaining to at least a primary network and a secondary network to which the at least one wireless device is registered with, wherein the primary network and secondary network are the first wireless network and the second wireless network, respectively, a routing server operatively communicable with the request server for adding a radio frequency header to the message, transmitting the message to at least one of the at least one wireless device in the primary network and, after a predetermined number of transmission attempts, optionally receiving a negative acknowledgement message from the primary network and transmitting the negative acknowledgement message to said routing server, and a complementary network server for receiving the message from said routing sewer and adding a message transmission header an accordance with the protocol used by the secondary network, and wherein the secondary network has means for switching, operatively communicable with the secondary network, that receives the message transmitted by the complementary network server and transmits the message to the at least one wireless device via the secondary network, a method of enabling the first device to transmit a data message to the at least one wireless device, said method comprising the steps of:

transmitting a message from the first device to at least the first wireless network;

reading a profile of the at least one wireless device, the profile comprising data pertaining to at least a primary network and a secondary network to which the at least one wireless device is registered with, wherein the primary network and secondary network are said first wireless network and said second wireless network, respectively;

adding a radio frequency header to the message;

transmitting the message to at least one of said at least one wireless device in the primary network and, after a predetermined number of transmission attempts, optionally receiving a negative acknowledgement message from the primary network;

adding a message transmission header in accordance with the protocol used by the secondary network;

transmitting the message to the secondary network; and receiving the message at the secondary network and further transmitting the message to at least one of said at least one wireless device via the secondary network.

63. In a data communication system having a routing switch with an internal routing server that receives the message from means for processing and attaches to the message transmission headers for internal routing within a wireless network, a request server for reading a profile of the at least one wireless device, the profile comprising data pertaining to at least a first network and a second network to which the at least one wireless device is registered with, a routing server operatively communicable with the request server for adding a radio frequency header to the message, transmitting the message to at least one of the at least one wireless device in the first network and, after a predetermined number of transmission attempts, optionally receiving a negative acknowledgement message from the first network and transmitting the negative acknowledgement message to said routing server, and a complementary network server for receiving the message from said routing server and adding a message transmission header in accordance with the protocol used by the second network, and wherein the second network has means for switching, operatively communicable with the secondary network, that receives the message transmitted by the complementary network server and transmits the message to the at least one wireless device via the second network, a communication system comprising: a first communication device transmitting a data message and communicating in accordance with a first communication format; a primary wireless network operatively connected to, and directly communicating with, said first communication device and receiving the data message, said primary wireless network determining responsive to the data message whether the data message is to be broadcast within said primary wireless network and outside said primary wireless network, and when the data message is to be broadcast within said primary wireless network, formatting the data message to be received in accordance with the first communication format, transmitting the data message to a device destination within said primary wireless network via first wireless communication, and when the data message is to be transmitted outside said primary wireless network, optionally in addition to the transmitting the data message within said primary wireless network, said primary wireless network formatting the data message in accordance with a second communication format and transmitting the data message outside said primary network; a second communication device not capable of directly communicating with said primary wireless network and communicating in accordance with the second communication format; a complimentary wireless network operatively connected to, and directly communicating with, said second communication device and said primarily wireless network, said complimentary wireless network receiving the data message from the primary wireless network and transmitting the data message to said second communication device responsive to said second communication formal formatted by said primary wireless network.

* * * * *

UNITED STATES PATENT AND TRADEMARK OFFICE
CERTIFICATE OF CORRECTION

PATENT NO.       : 6,947,737 B2
APPLICATION NO.  : 09/958752
DATED            : September 20, 2005
INVENTOR(S)      : Massie et al.

It is certified that error appears in the above-identified patent and that said Letters Patent is hereby corrected as shown below:

FIG. 16a, box 1612, "QUEVE" should read -- QUEUE --

Column 2, line 9, "port, of" should read -- port of --

Column 5, line 56, "Internet-working" should read -- Inter-networking --

Column 11, line 35, "of e signal received" should read -- of the signal received --

Column 12, line 9, "RP/NCPs" should read -- RF/NCPs --

Column 12, line 39, "an FIBS message" should read -- an IB message --

Column 13, line 35, "sent form the" should read -- sent from the --

Column 16, line 62, "protocols)" should read -- protocol(s) --

Column 18, line 24, "protocols)" should read -- protocol(s) --

Column 20, line 19 (Claim 1), "that;" should read -- that: --

Column 20, line 61 (Claim 6), "least on wireless" should read -- least one wireless --

Column 21, line 8 (Claim 6), "the massage to" should read -- the message to --

Column 22, line 10 (Claim 13), "routing sewer for" should read -- routing server for --

Column 22, line 31 (Claim 16), "routing sewer that" should read -- routing server that --

Column 22, line 42 (Claim 16), "routing sewer operatively" should read -- routing server operatively --

Column 22, line 51 (Claim 16), "network sewer for" should read -- network server for --

Column 23, line 7 (Claim 18), "massage" should read -- message --

Signed and Sealed this
Twenty-fifth Day of January, 2011

David J. Kappos
*Director of the United States Patent and Trademark Office*

CERTIFICATE OF CORRECTION (continued)
U.S. Pat. No. 6,947,737 B2

Column 23, line 47 (Claim 21), "rotating server;" should read -- routing server; --

Column 23, line 53 (Claim 21), "server mid transmitting" should read -- server and transmitting --

Column 23, line 65 (Claim 22), "each massage from" should read -- each message from --

Column 24, line 33 (Claim 26), "routing saver operatively" should read -- routing server operatively --

Column 24, line 66 (Claim 28), "routing sewer for" should read -- routing server for --

Column 25, line 65 (Claim 32), "transmission attempt -" should read -- transmission attempts --

Column 26, line 53 (Claim 38), "with die first" should read -- with the first --

Column 27, line 18 (Claim 40), "transmission attempt" should read -- transmission attempts --

Column 27, line 45 (Claim 43), "said at leant one" should read -- said at least one --

Column 28, line 45 (Claim 48), "fist wireless network." should read -- first wireless network --

Column 30, line 61 (claim 60), "that;" should read -- that: --

Column 30, line 62 (Claim 60), "data massage from" should read -- data message from --

Column 30, line 65 (Claim 60), "network end a secondary" should read -- network and a secondary --

Column 32, line 19 (Claim 62), "sewer and adding a message transmission header an" should read -- server and adding a message transmission header in --

Column 34, line 17 (Claim 63), "formal" should read -- format --